United States Patent [19]
Nakamura et al.

[11] Patent Number: 5,877,892
[45] Date of Patent: Mar. 2, 1999

[54] FOCUS DETECTING APPARATUS FOR A TELESCOPE SYSTEM

[75] Inventors: Satoru Nakamura; Shinichi Suzuki; Takayuki Sensui; Takayuki Ito, all of Tokyo; Hirofumi Matsuo, deceased, late of Saitama-ken, by Chizuko Matsuo, heir; Tatsuo Gotoh; Yasuo Nakamura, both of Tokyo, all of Japan

[73] Assignees: Asahi Seimitsu Kabushiki Kaisha; Asahi Kogaku Kogyo Kabushiki Kaisha, both of Tokyo, Japan

[21] Appl. No.: 831,161

[22] Filed: Apr. 1, 1997

[30] Foreign Application Priority Data

Apr. 1, 1996 [JP] Japan ................................. 8-079106

[51] Int. Cl.[6] ............................ G02B 23/00; G01B 11/00
[52] U.S. Cl. ........................... 359/426; 359/429; 356/375
[58] Field of Search .................................... 359/425, 426, 359/427, 429, 419, 629; 250/201.2; 356/375, 408

[56] References Cited

U.S. PATENT DOCUMENTS

| | | |
|---|---|---|
| 4,394,569 | 7/1983 | Nakamura . |
| 4,485,303 | 11/1984 | Suzuki . |
| 4,491,402 | 1/1985 | Suzuki . |
| 4,620,774 | 11/1986 | Moskovich ............................ 359/753 |
| 5,087,125 | 2/1992 | Narutaki ................................ 356/375 |
| 5,099,131 | 3/1992 | Brownrigg et al. ................ 250/458.1 |
| 5,266,982 | 11/1993 | Soshi . |

FOREIGN PATENT DOCUMENTS 7159160  6/1995  Japan .

*Primary Examiner*—Jon Henry
*Attorney, Agent, or Firm*—Greenblum & Bernstein, P.L.C.

[57] ABSTRACT

An automatic focus detecting telescope which offers easy maintenance and which, when applied to a surveying instrument such as an auto-level, provides easy detachment and attachment of an optical horizontal compensation system. Even if the optical horizontal compensation system is detached, no readjustments are required for the automatic focusing apparatus and the eyepiece optical system.

30 Claims, 23 Drawing Sheets

FOCUS DETECTING APPARATUS FOR A TELESCOPE SYSTEM

BACKGROUND OF THE INVENTION

1. Field of the Invention

The present invention relates to a telescope including an automatic focus detecting apparatus which can be applied to a surveying instrument such as an auto-level, etc.

2. Description of the Related Art

The surveying instrument basically comprises a collimating telescope. The collimating telescope is provided with a focusing lens group in order to view a clear object image regardless of the distance of the aiming object. The telescope is provided, in order from the object side, with an objective lens system (which includes the focusing lens group), and an eyepiece lens group system. The position of the focusing lens group is adjusted according to the distance from the object, so that an image of the object may be formed on a focusing plate. The operator may thus observe the image superimposed on the focusing plate via the eyepiece lens group system.

For example, provided that the range of the object distance is between 2 m–infinity, and that the focusing lens group is a concave lens, the approximate amount of movement of the focusing lens is about 30 mm. The focusing lens group is normally driven through an operation of a rotation knob. If the amount of movement of the object image (i.e., the amount of movement of the focusing lens group) is set smaller in regard to the rotating angle of the rotation knob, the object image remains on the focusing plate longer due to the smaller amount of movement of the object image when compared with the rotating angle, but it is time-consuming to move such a lens. On the other hand, if the amount of movement of the object image is set larger with respect to the rotating angle of the rotation knob, the amount of movement of the object image becomes too large when compared with the rotative angle, and the object image remains on the focusing plate for a shorter time. Consequently, the operator may sometimes pass by the focal point (in-focus condition) without noticing the coincidence of the object image with the focusing plate and the focal point, leading to extra time taken for refocusing.

Additionally, if the object is positioned far from the telescope, focusing is easily performed through only a slight operation of the rotation knob in the rotating direction, since the amount of movement of the object image is larger when compared with the rotative angle of the rotative knob. On the other hand, if the object is positioned relatively close to the focusing lens, the amount of movement of the object image is smaller when compared with the amount of rotation of the rotation knob, and it is difficult to move the object image on the focusing plate despite more rotation of the rotation knob. In such a case, it is difficult to determine whether the aiming object is in a front focus or a rear focus position, which may lead the operator to rotate the rotation knob in the wrong direction with respect to the focal point. In any event, the conventional surveying instrument suffers from the fact that it takes too much time for focusing.

An auto-level basically comprises a collimating telescope and an optical horizontal compensation system. The collimating telescope is substantially set, with respect to the horizon, then a reference object is observed. At that time, if an optical axis of the telescope is not perfectly horizontally set, the horizontal compensation system coincides the collimation line with a horizontal line. The telescope is then pivotally rotated around a vertical axis perpendicular to the optical axis, and when an operator views any collimation point, the viewed collimation point is positioned with the imaginary horizontal surface that includes the reference point (the set horizon).

In order to overcome the above-mentioned problem, an auto-level is provided, to which a TTL (through-the-lens) type of automatic focus detecting apparatus is mounted. As is well known, however, the auto-level requires a regular readjustment of the optical horizontal compensation system in order to maintain horizontal accuracy. The optical horizontal compensation system is decoupled from the auto-level during readjustment, and is coupled again after the readjustment ends. Therefore, when the automatic focus detecting system is mounted to the auto-level, easy decoupling and coupling of the optical horizontal compensation system is desired.

SUMMARY OF THE INVENTION

It is an object of the present invention to provide an automatic focus detecting telescope, which offers easy maintenance.

It is another object of the present invention to provide an automatic focus detecting telescope in which, when applied to an auto-level, easy detachment and attachment of an optical horizontal compensation system is provided, with no requirement of readjustments of an automatic focusing apparatus and an eyepiece optical system regardless of detachment and attachment of the optical horizontal compensation system, further, in which an easy adjustment process is provided when readjustment is required.

To achieve the object mentioned above, according to the present invention, there is provided a focus detecting apparatus which comprises an objective lens system which at least includes an objective lens group and a focusing lens group, a beam splitting optical system comprising a beam splitting optical element by which an optical path between the objective lens system and a focal plane is split. A focus detecting means detects a focal state on a split focal plane in the beam splitting optical system which is optically equivalent to the focal plane. The beam splitting optical system and the focus detecting means are formed integrally so that the beam splitting optical system and the focus detecting means can be detached from and attached to the telescope as one unit.

The focus detecting apparatus further comprises a focusing means which moves the focusing lens group so that an object image formed by the objective lens system can be drawn on a predetermined focal plane, and a detecting means which detects a focusing state based on the detecting signal of the focus detecting means.

The focus detecting apparatus further comprises a driving means which moves the focusing lens group based on the detected focus state to an object image formed by the objective lens system drawn on a predetermined focal plane.

The objective lens system is supported by a lens barrel, and the beam splitting optical system and the focus detecting means are integrally formed so that the beam splitting optical system and the focus detecting means can be detached from and attached to the lens barrel as one unit.

The focus detecting apparatus further comprises an imaging device which picks up the object image and contains a light receiving surface which acts as the focal plane. The imaging device is integrally formed with the beam splitting optical means and the focus detecting means. There is also an optical horizontal compensation system which is located between the objective lens system and the beam splitting optical element and can be detached from or attached to the lens barrel, and an erecting optical system which is located between the objective lens system and the beam splitting optical element.

The beam splitting optical system and the lens barrel comprise a positioning member which maintains an equivalent optical relation in regard to the focal plane and the split focal plane.

A second aspect of the focus detecting apparatus comprises a focusing plate which predetermines the position in which an object image will be formed by the objective lens group, an eyepiece lens group for observing an object image formed on the focusing plate.

The focusing plate is integrally supported by the eyepiece lens group. The focusing plate and the eyepiece lens group are integrally formed so they can be detached from or attached to the telescope.

In another aspect of the focus detecting apparatus, the focusing plate is integrally formed with the beam splitting optical system and the focus detecting means so they can be detached from and attached to the telescope as one unit.

In yet another aspect, the focusing plate and eyepiece lens group are integrally mounted to the beam splitting optical system and the focus detecting means so they can be detached from and attached to the telescope as one unit.

The focusing plate and the eyepiece lens group are supported by a common member, and the member is fixed by screws on a fixing member which supports the beam splitting optical system and the focus detecting means.

In yet another aspect, the beam splitting optical system, the focus detecting means and the focusing plate are supported by a common fixing member, and the eyepiece lens group is also supported by the common fixing member.

In still another aspect, the imaging device, the beam splitting optical system and the focus detecting means are integrally formed so they can be detached from or attached to the telescope as one unit.

The focus detecting apparatus further comprises an optical horizontal compensation system which can be detached from or attached to the telescope, and an erecting optical system which is located between the objective lens system and the beam splitting optical system.

The focus detecting means further comprises a mirror which reflects split light into the object side, and a sensor which receives light reflected by the mirror. The sensor overlaps the optical horizontal compensation system without interfering with said system.

In still another aspect of the invention, the focus detecting apparatus comprises an objective lens system which forms an object image on or near a predetermined focal plane, a focus detecting means which detects a focal state on a split focal plane in the beam splitting optical system which is the optical equivalent to the focal plane, and an optical horizontal compensation system which is located between the objective lens system and the beam splitting optical system.

The beam splitting optical element is affixed to an optical element of the optical horizontal compensation system.

The fixing member that supports the beam splitting optical system and the focus detecting means is itself supported by a supporting member of the optical horizontal compensation system using screws.

The focus detecting apparatus further comprises a focusing plate which contains the focal plane.

The beam splitting optical system, the focus detecting means and the lens barrel comprise a positioning member which maintains an equivalent optical relation in regard to the focal plane and the split focal plane.

The present disclosure relates to subject matter contained in Japanese Patent Application No. 08-79106 (filed on Apr. 1, 1996) which is expressly incorporated herein by reference in its entirety.

BRIEF DESCRIPTION OF THE DRAWINGS

The invention is described below in detail with reference to the accompanying drawings, in which.

DESCRIPTION OF THE PREFERRED EMBODIMENTS

Figure 1:
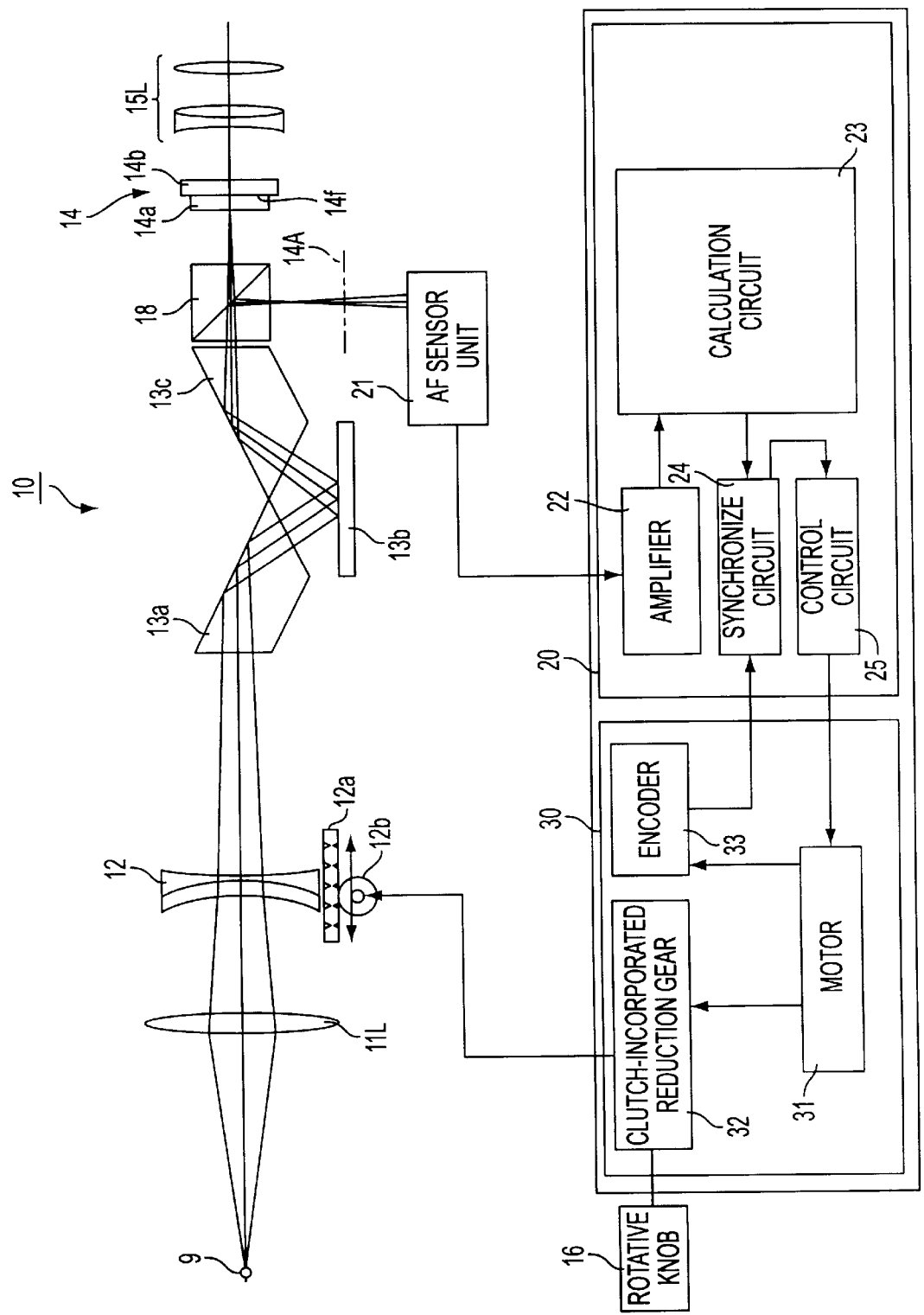
FIG. 1 is a block diagram of the main elements of an embodiment of an auto-level to which a telescope according to the present invention is applied.

The present invention is described with reference to drawings attached hereto, with respect to an auto-level to which embodiments of the present invention are applied. FIG. 1 shows a block diagram of the main components of an auto-level according to the present invention. The auto-level 10 consists of a collimating objective lens group 11L of positive power as an objective lens group, a focusing lens group 12L of negative power, an optical horizontal compensation system 13, a beam splitter (a beam splitting optical element) 18, a focusing plate 14 (which includes a first focusing plate 14a and a second focusing plate 14b, the joint surface of which defines a focal plane 14f), and a positive eyepiece 15L, in the recited order from the object side (left side of FIG. 1).

The optical horizontal compensation system 13, per se known, consists of a first compensation prism 13a, a compensation mirror 13b, and a second compensation prism 13c, and has a symmetrical shape. The optical horizontal compensation system 13 is hung from a shaft by a string (not shown). The angle α defined between the compensation mirror 13b and the first compensation prism 13a is identical (in absolute-value) to the angle defined between the compensation mirror 13b and the second compensation prism 13c, but opposite in direction. The angle α, for example 30°, varies depending on the length of the string, etc.

When the optical horizontal compensation system 13 is set so that the optical axes of the objective lens group 11L and the focusing lens group 12L are substantially parallel (inclined at, for example, about 10 to 15 minutes with respect to the horizontal axis), light incident upon the first compensation prism 13a is displaced from the horizontal direction by the same amount, but the light reflected by and emitted from the first compensation prism 13a, the compensation mirror 13b and the second compensation mirror 13c, is substantially collimated.

The focusing lens group 12L is provided with a rack 12a secured thereto, which is engaged by a pinion 12b. A rotation knob 16 is provided perpendicular to an optical axis in the middle of the auto-level 10. When a rotation of the pinion 12b takes place via the rotation knob 16 in order to move the focusing lens group 12L forward and backward in the optical axis direction, the image of an object (e.g., a surveying staff) 9 formed by the objective lens group 11L and the focusing lens group 12L is translated along the optical axis. The operator views the object image formed on the focal plane 14f together with the reticle (i.e., drawn on the focal plane 14f) through the eyepiece 15L.

The present invention relates to the auto-level 10 as discussed above, to which a TTL-type automatic focusing apparatus is mounted. As illustrated in FIG. 1, the beam splitter (beam splitting optical element) 18 is provided in the light path between the objective lens group 11L and the focusing plate 14 to split the light (or light path). A focus detecting focal plane (a split focal plane) 14A (which is optically equivalent to the focal place 14f of the focal plate 14) and a focus detecting system (focus detector) 20 to detect the focus state at the focus detecting focal plane 14A are provided in the split light path. The focusing lens group 12L is driven by a lens driver 30 in accordance with the output of the focus detector 20.

The focus detector 20 includes an AF sensor unit (a sensor) 21 located in the vicinity of the focus detecting focal plane 14A, so that the defocus amount can be detected in accordance with the output of the AF sensor 21. Thus, the determination of defocus is made regarding whether front focus or rear focus, or whether focalized or not. Various types of practical structures of the AF sensor unit 21 are known per se. For example, in the case of a phase difference type, the AF sensor 21 is used where the object image on the focus detecting focal plane 14A is split by separator lenses or image forming lenses, and is re-formed on a pair of CCD line sensors included in the sensor 21. The CCD lines sensors 21c are each provided with a number of photoelectric transducers, and output sensor signals (pixel signals) generated by photoelectric transducers. The sensor signals are amplified by an amplifier 22, and input to a calculation circuit 23. The calculation circuit 23 obtains a distance between two images formed on the pair of line sensors based on the sensor signals, thus obtaining a defocus amount. Consequently, an amount of movement of the focusing lens group 12L is obtained based on the defocus amount.

The lens driver 30 transmits the rotation of a motor 31 to the pinion 12b via a clutch-incorporating reduction gear 32. The resulting calculation by the calculation circuit 23 is sent to the motor 31 via a synchronizer circuit 24 and a control circuit 25. An encoder 33 checks the rotation of the motor 31, and the output from the encoder 33 is sent to the synchronizer circuit 24 in order to feedback the position of the focusing lens group 12L.

The pinion 12b rotates, by means of the focus detector 20 and the lens driver 30, by an amount corresponding to the distance to an object. Then the rack 12a (along with the focusing lens group 12L) moves along the optical axis, and hence, automatic focusing is performed. The pinion 12b is driven in either a manual focus mode (in which the manual focusing operation is carried out using the rotation knob 16) or in an autofocus mode (in which the automatic focusing operation is carried out in accordance with the focus detector 20 and the focusing lens group drive system 30 and the motor 31). Namely, the auto-level 10 is constructed such that the focusing mode is switched between the autofocus mode, in which the focusing lens group 12L is driven in accordance with the output of the focus detector 20, and the manual focus mode, in which the focusing lens group 12L is driven manually regardless of the output of the focus detector 20.

Regarding switching between the manual focus mode and the autofocus mode, for instance, when the rotation knob 16 is moved in one direction along the optical axis, the manual mode is obtained, and when the rotative knob 16 is moved in another direction along the optical axis, the autofocus mode (AF mode) is obtained (i.e., the mode is switched depending on whether the rotation knob 16 is pushed in or pulled out). The rotation of the rotation knob 16 is transmitted to the pinion 12b in the manual focus mode, while the rotation of the motor 31 is transmitted to the pinion 12b in the auto focus mode.

As discussed above, when the optical axes of the objective lens group 11L and the focusing lens group 12L are substantially parallel, light emitted from the optical horizontal compensation system 13 is substantially collimated. The light emitted from the optical horizontal compensation system 13 is split, and hence, an image which is formed and observed on the focal plane 14f, and an image which is formed on the focus detecting focal plane 14A in order to detect a focusing state, are substantially identical.

Figure 3:
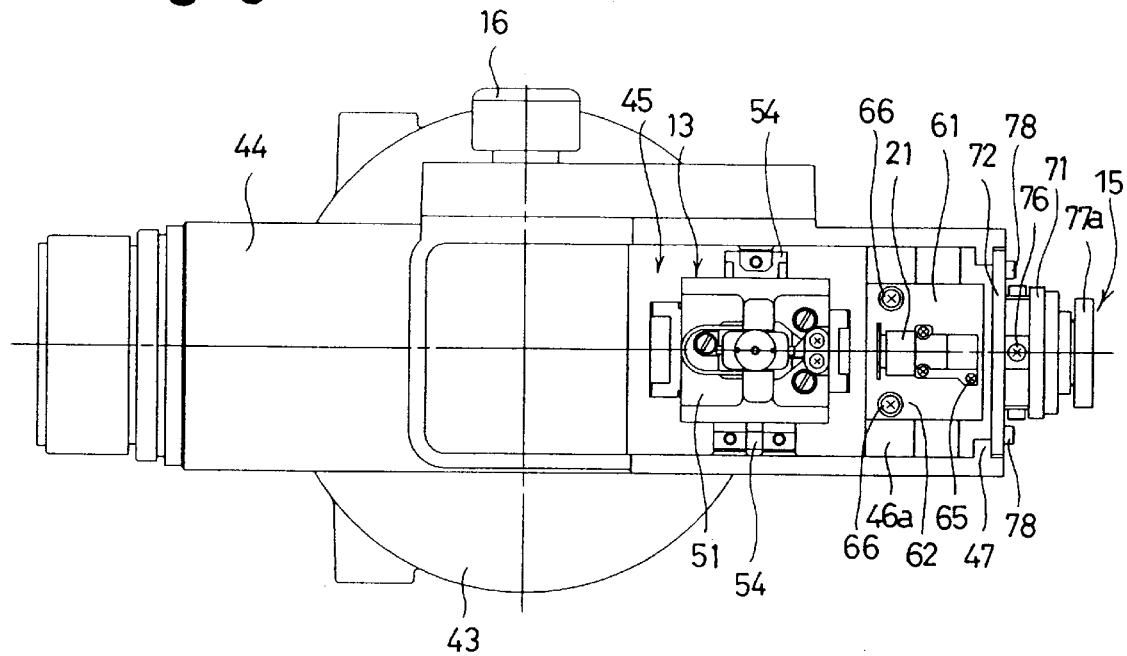
FIG. 3 is a plan view of the first embodiment of the present invention.
Figure 2:
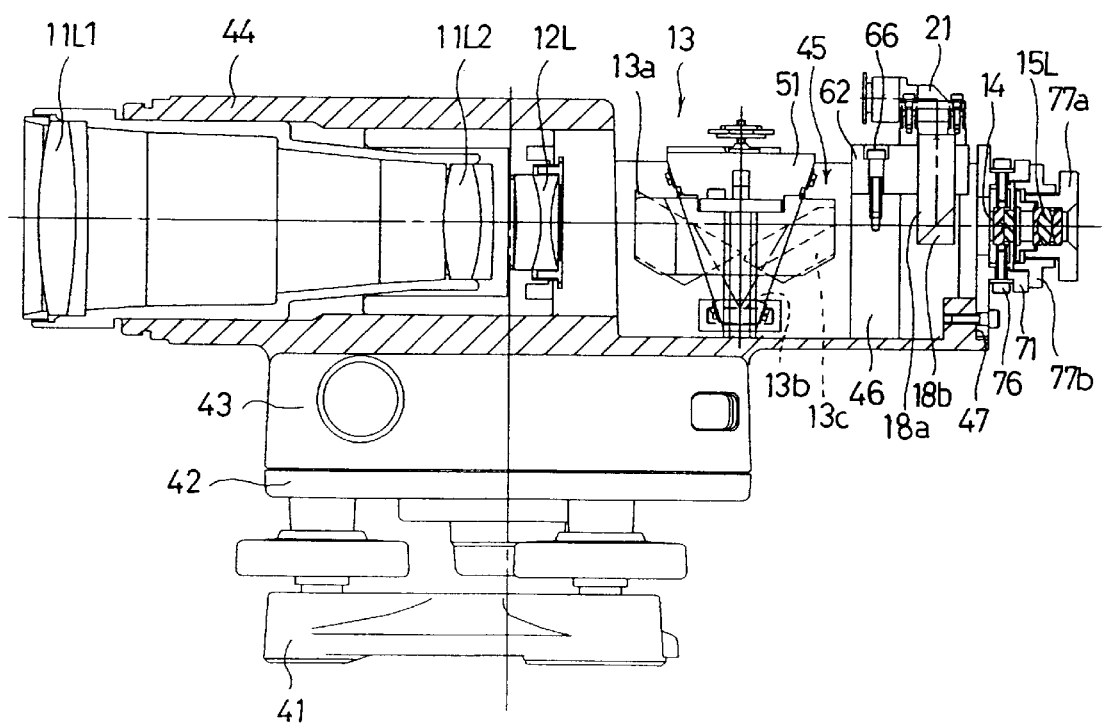
FIG. 2 is a longitudinal partial sectional view of an auto-level according to a first embodiment of the present invention.

FIG. 2 is a longitudinal partial sectional view, FIG. 3 is a plan view, of an auto-level 10 according to a first embodiment of the present invention. FIGS. 2 and 3 specifically show a structure of an optical system in FIG. 1, in which common reference numerals are given.

The auto-level 10 includes a bottom plate 41, a level table 42 which is mounted on the bottom plate 41, a rotating table 43 which rotates around a vertical axis, and a lens barrel 44 of a collimating telescope. The lens barrel 44 is integrally formed with the rotating table 43, so that the optical axis of the lens barrel 44 is perpendicular to the vertical axis of the rotating table 43. The lens barrel 44 includes objective lenses 11L1 and 11L2 as an objective lens system, a focusing lens group 12L, an optical horizontal compensation system 13, a beam splitter 18 as a beam splitting optical element, an eyepiece (an eyepiece lens group) 15L as an ocular optical system, and an AF sensor unit 21. The auto-level 10 includes a cover (not shown) through which the optical horizontal compensation system 13 is decoupled (detached) and coupled (attached), and FIGS. 2 and 3 show the cover removed. Toward the rear of the lens barrel (on the right of FIGS. 2 and 3), a storage cavity 45 is formed in which the optical horizontal compensation system 13, the beam splitter 18, the AF sensor unit 21 and the eyepiece 15L are mounted. The storage cavity 45 has a cover (not shown) for shielding light.

In the first embodiment of the present invention, the optical horizontal compensation system 13 is attached to an optical horizontal compensation system fixing frame 51, to be handed as a unit. In the same manner, the beam splitter 18 and the AF sensor unit 21 are fixed on a sensor fixing frame 61 to be handled as a unit, and the focal plate 14 and the eyepiece 15L are fixed on an eyepiece fixing frame 71 to be handled as a unit. Each of the frames 51, 61 and 71 can be separately coupled to and decoupled from the storage 45 of the lens barrel 44.

Figure 14:
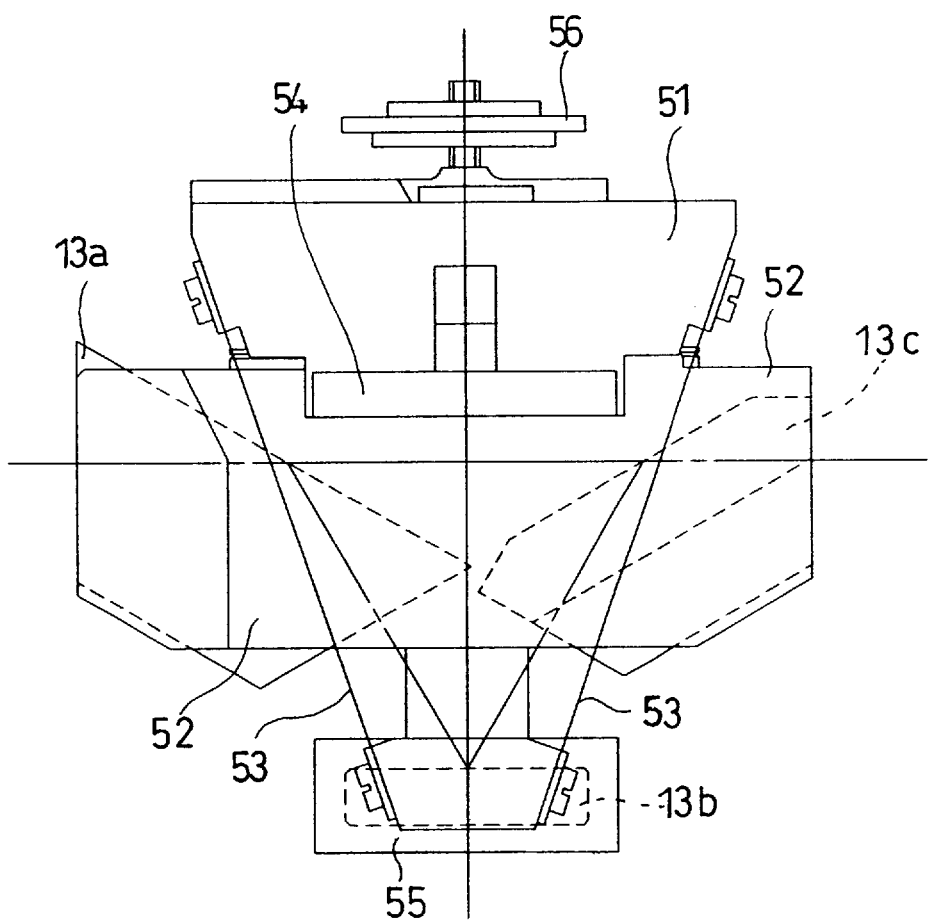
FIG. 14 is a longitudinal partial sectional view of an example of an optical horizontal compensation system of an auto-level according to the present invention.
Figure 15:
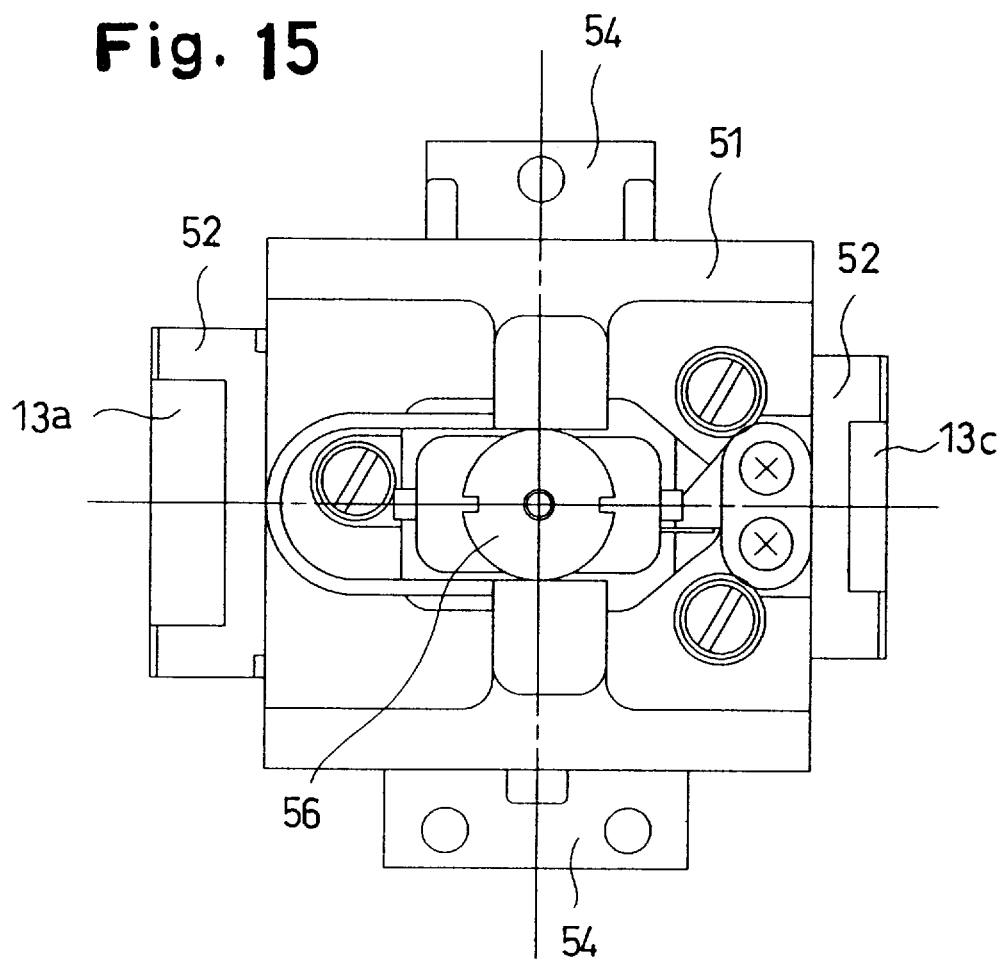
FIG. 15 is a plan view of the optical horizontal compensation system according to the present invention.

As illustrated in FIGS. 14 and 15, the first compensation prism 13a and the second compensation prism 13c of the optical horizontal compensation system 13 are respectively fixed on a supporting frame 52. The supporting frame 52 is fixed on the optical horizontal compensation system fixing frame 51. The compensation mirror 13b is fixed on a mirror supporting frame 55, and hung from the optical horizontal compensation system fixing frame 51 by four strings 53. The optical horizontal compensation system fixing frame 51 has a shape that bridges over the optical axis when attached to the lens barrel 44. The strings 53 of the optical horizontal compensation system 13 may, over time, be lengthened or cut, and it is therefore desired that easy decoupling and coupling of the optical horizontal compensation system 13 is provided when the strings 53 are replaced. Therefore, the optical horizontal compensation system fixing frame 51 has positioning portions 54 protruding from shoulder portions of one frame 51, which engage end surfaces of supporting portions (not shown) formed inside the storage 45. Consequently, the positioning portions 54 engage end surface of the supporting portions, and the optical horizontal compensation system 13 is placed at the predetermined position and fixed on the lens barrel 44 using fixing screws (see FIG. 3). Reference numeral 56 in FIGS. 14 and 15 is a balance adjusting weight.

The beam splitter 18 includes a lamination of a first prism 18a and a second prism 18b, and a beam splitting lamina 18c is formed between the laminating surfaces. The first prism 18a is placed on the side upon which light is incident, and has the shape of a square pillar elongated in the direction of the reflected light by the beam splitting lamina 18c, i.e., in the direction of the split light path. The first prism 18a has a pillar portion elongated in the direction perpendicular to the optical axis, and the split light path proceeds along the pillar portion. Consequently, the focus detecting focal point 14A is located in the vicinity of the surface of the first prism 18a from which light emits.

In the case as illustrated in FIG. 2, the AF sensor unit 21 is provided above the light emitting surface of the first prism 18a. The AF sensor unit 21 has a mirror 21a which deflects light, emitted from the emitting surface of the first prism 18a, by an angle of 90° forward (to the left side of FIG. 2). A sensor optical system (in the direction of light reflected by the mirror 21a) splits light transmitting through the focus detecting focal plane 14A, so that a virtual image formed on the focus detecting focal plane 14A is re-formed on both of a pair of the line sensors. The AF sensor unit 21 in the present embodiment is mounted in a direction in which the mirror 21a reflects light of an object.

The focusing plate 14 is provided toward the rear of the light emitting surface of a second prism 18b, and further toward the rear of the focusing plate 14 is the eyepiece 15L.

In the described structure, the optical horizontal compensation system 13, the beam splitter 18, the AF sensor unit 21, the focusing plate 14 and the eyepiece 15L are respectively positioned. The fixing structure of the optical horizontal compensation system 13, the beam splitter 18, the AF sensor 21, the focusing plate 14 and the eyepiece 15L are described specifically with reference to FIGS. 2 through 27.

One of the embodiments of the present invention is constructed such that the beam splitting optical element (the beam splitter) 18 and the AF sensor unit 21 are at least integrated with each other as one unit which can be detached from an attached to the lens barrel 44 (the storage cavity 45).

Another embodiment of the present invention is constructed such that the beam splitting optical element 18 and the AF sensor unit 21, together with the focusing plate 14, or together with the focusing plate 14 and with the eyepiece 15L, are integrated as one unit which can be decoupled from or coupled to the lens barrel 44 (the storage 45).

In any embodiment in the present invention, the focusing plate 14 and the eyepiece 15L can be replaced with an imaging device, for example, a CCD imaging element (CCD image sensor).

When applied to the auto-level 10, the optical horizontal compensation system 13, the beam splitting optical element 18, and the AF sensor unit 21 can be integrated as a unit.

Additionally, when applied to any surveying apparatus other than an auto-level, the optical horizontal compensation system in the present invention can be replaced with, for example, an erecting optical system.

Figure 4:
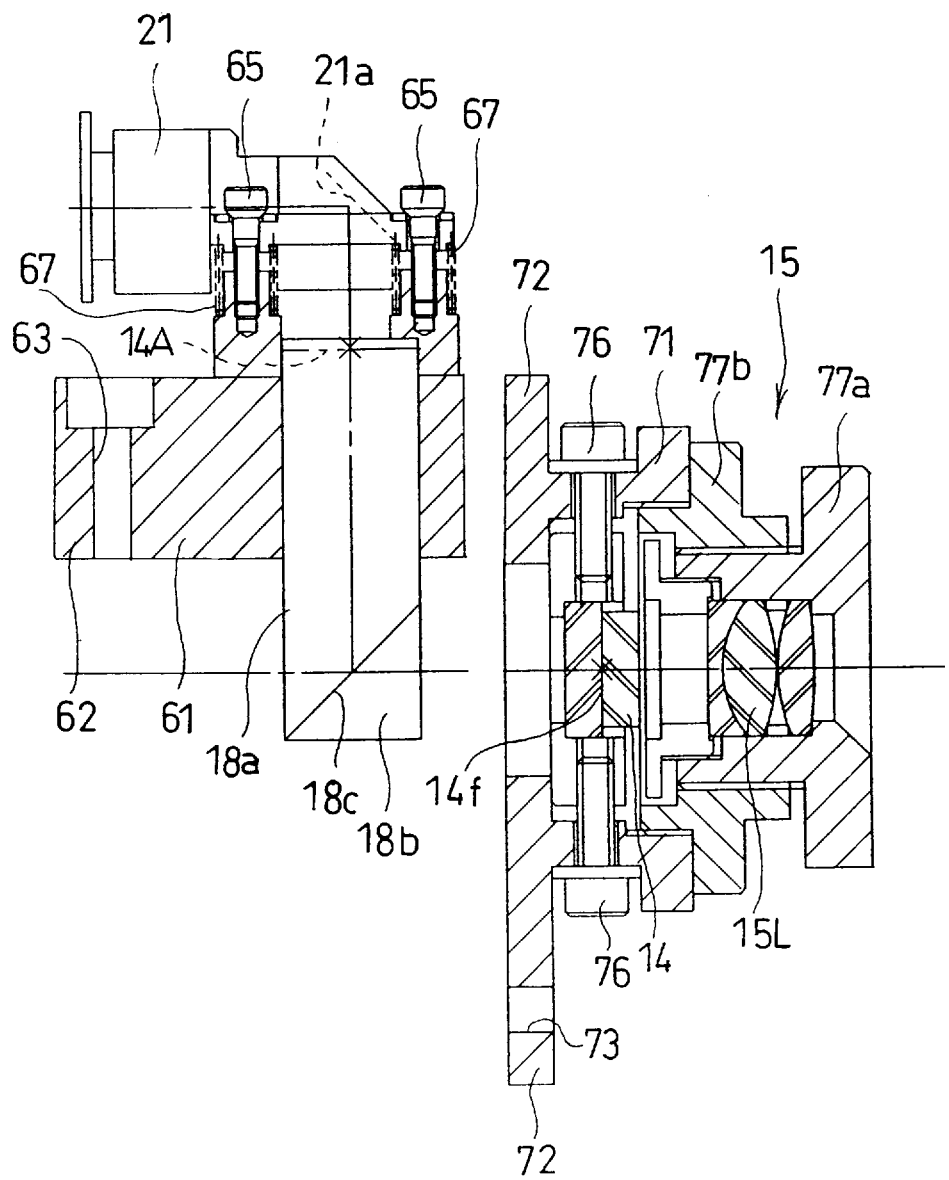
FIG. 4 is a longitudinal partial sectional view showing the main portion of a position fixing structure in regard to a beam splitter, an AF sensor unit, a focusing plate and an eyepiece, according to the first embodiment of the present invention.

FIGS. 2 through 4 illustrate the first embodiment of the present invention, in which the beam splitter 18 and the AF sensor unit 21 are integrated as a unit, and the focusing plate 14 and the eyepiece 15L are integrated as a unit. The beam splitter 18 is fixed on the fixing frame 61. The AF sensor unit 21 is adjustably screwed to the fixing frame 61 using three fixing screws 65. Each fixing screw 65 has a coil spring 67 through which the fixing screw 65 extends, so that the coil springs 67 regularly bias the AF sensor unit 21 in the direction opposite to the fixing frame 61.

Fixing frame supporting surfaces 46a of fixing frame supporting portions 46 protrude from the left and right inner walls of the storage cavity 45. The sensor fixing frame 61 includes position fixing portions 62 which engage fixing frame supporting surfaces 46a of the fixing frame supporting surface 46, and positioning holes 63 are formed in the position fixing portions 62. The fixing portion supporting surfaces 46a include screw holes 46b at positions opposite the positioning holes 63. Fixing screws 66 are screwed into the screw holes 46b through the positioning holes 63, and the fixing screws 66 fix the sensor fixing frame 61 on the lens barrel 44.

The eyepiece fixing frame 71, to which the focusing plate 14 and the eyepiece 15L are integrally mounted, has a cylindrical shape. The focusing plate 14 is adjustably supported by four focusing plate supporting screws 76 so that the surface of the focusing plate 14 is perpendicular to the optical axis. The eyepiece 15L is supported to move forward and backward along the optical axis via a diopter movement operation ring 77a and a diopter movement helicoid 77b.

The eyepiece fixing frame 71 includes a position fixing portion 72 in the shape of a flange which engages a rear end rack 47 of the lens barrel 44. A plurality of positioning holes 73 are formed in the position fixing portion 72. A plurality of screw holes 47b are formed on the supporting surface 47a of the rear end rack 47 at positions corresponding to the positioning holes 73. The position fixing portion 72 of the eyepiece fixing frame 71 is in contact with the supporting surface 47a. Accordingly, the eyepiece fixing frame 71 is fixed on the lens barrel 44 by fixing screws 78 screwed into the screw holes 47b via the positioning holes 73.

Figure 5:
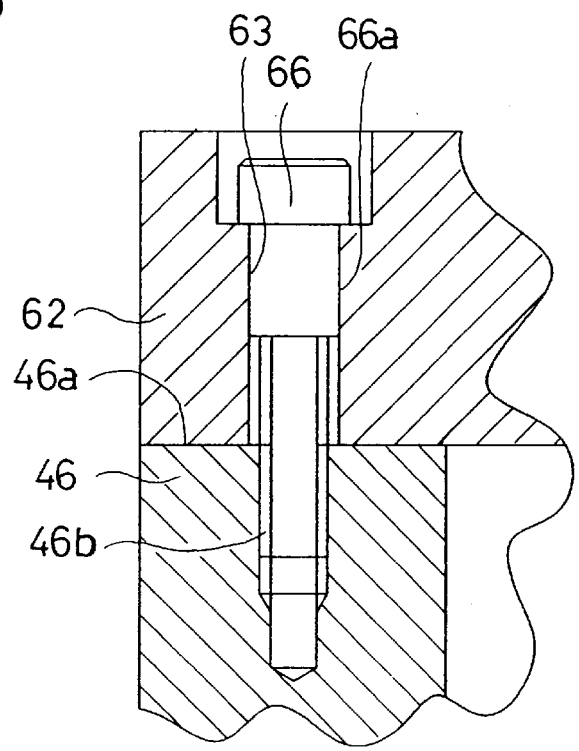
FIG. 5 is a schematic view of the main portion of a positioning structure in regard to the focusing plate and the eyepiece according to the first embodiment of the present invention.
Figure 6:
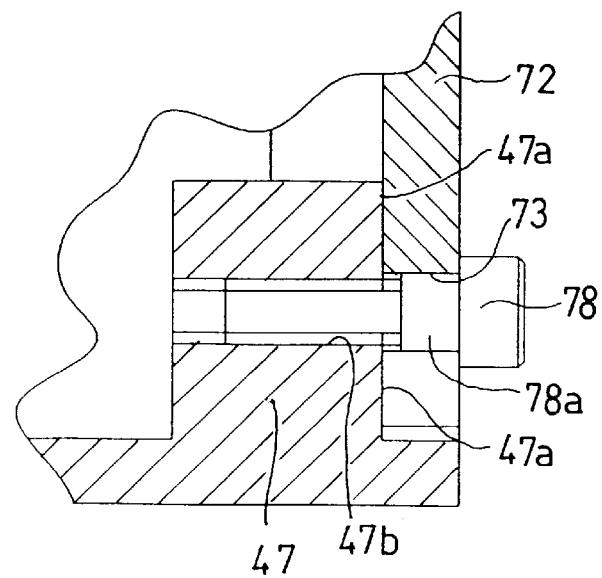
FIG. 6 is a schematic view of the main portion of the positioning structure in regard to the beam splitter and the AF sensor unit according to the first embodiment of the present invention.

FIGS. 5 and 6 are expanded sectional views around the fixing screws 66 and 78. The distance from the optical axis (the vertical position) of the sensor fixing frame 61 is determined by the contact of the fixing frame supporting portion 46 with the fixing frame supporting surface 46a. Further, the positioning of the sensor fixing frame 61 within the horizontal surface is determined by the contact of the unthreaded or shank portion 66a (between the head and the threaded portion) of the fixing screws 66 with the inner peripheral wall of the positioning holes 63. Similarly, the positioning of the eyepiece supporting frame 71 along the optical axis is determined by the contact of the fixing portion 72 thereof with the supporting surface 47a. The positioning of the eyepiece supporting frame 71 on the horizontal surface perpendicular to the optical axis is determined by the contact of shanks 78a of the fixing screws 78 with the inner peripheral wall of the positioning holes 73. Consequently, through a simple fix of the fixing frames 61 and 71 on the lens barrel 44 by the fixing screws 66 and 78, the beam splitter 18, the AF sensor unit 21, the focusing plate 14 and the eyepiece 15L are entirely positioned. Therefore, in the present embodiment, easy coupling and decoupling of the beam splitter 18, the AF sensor unit 21, the focusing plate 14 and the eyepiece 15L is possible. Additionally, the positioning of these optical components with respect to each other is no longer required.

Figure 8:
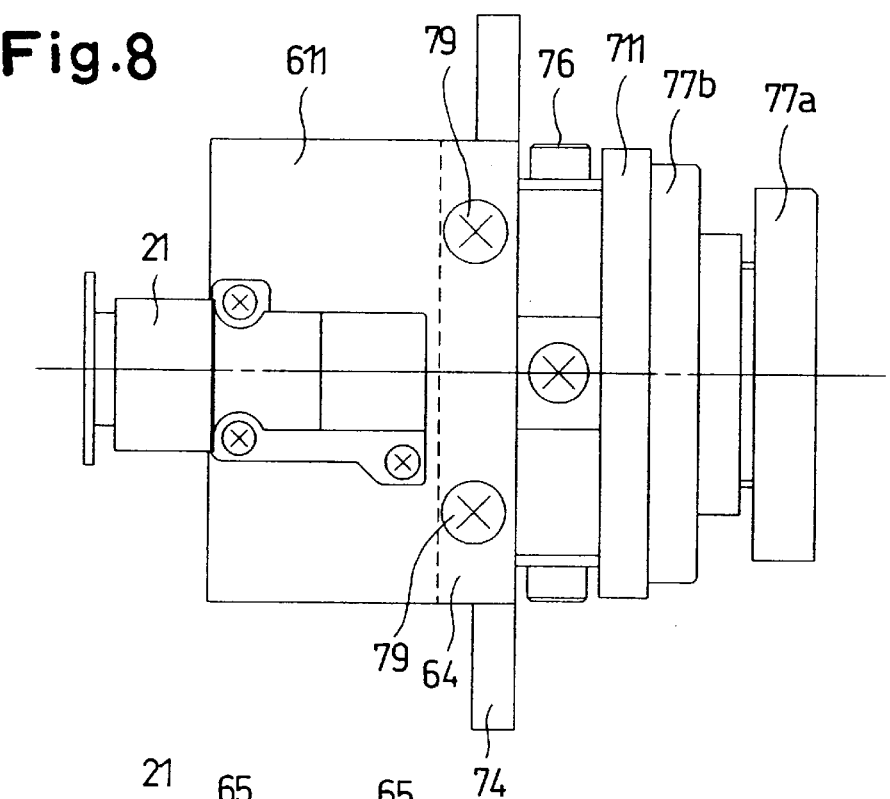
FIG. 8 is a plan view of the beam splitter, the AF sensor, a focusing plate and the eyepiece according to the second embodiment of the present invention.
Figure 7:
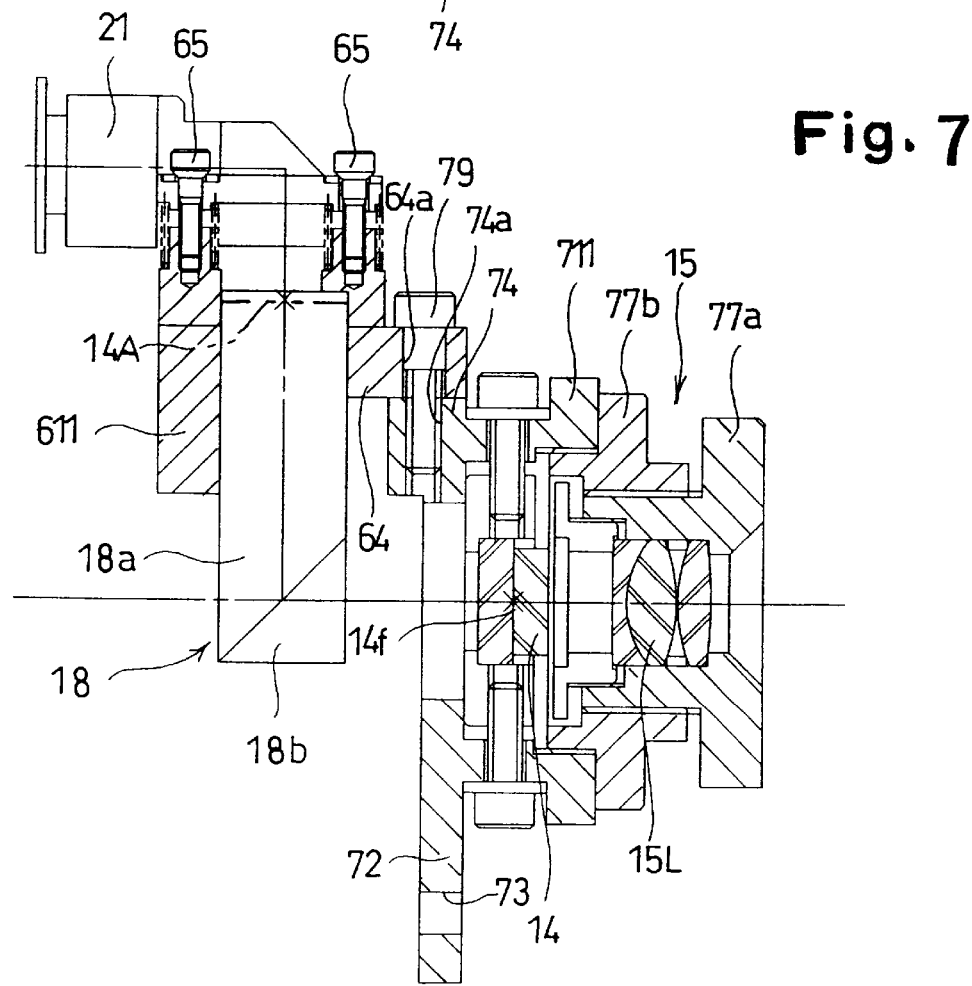
FIG. 7 is a longitudinal partial sectional view showing the main portion of a position fixing structure in regard to a beam splitter, an AF sensor unit, a focusing plate and an eyepiece, according to a second embodiment of the present invention.
Figure 10:
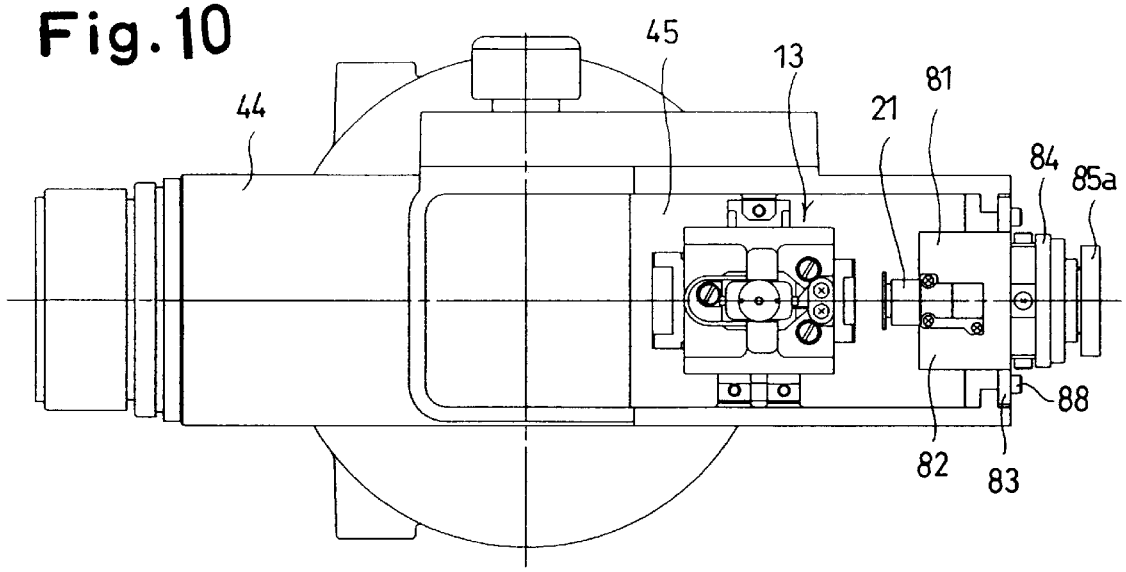
FIG. 10 is a plan view of the third embodiment of the present invention.
Figure 9:
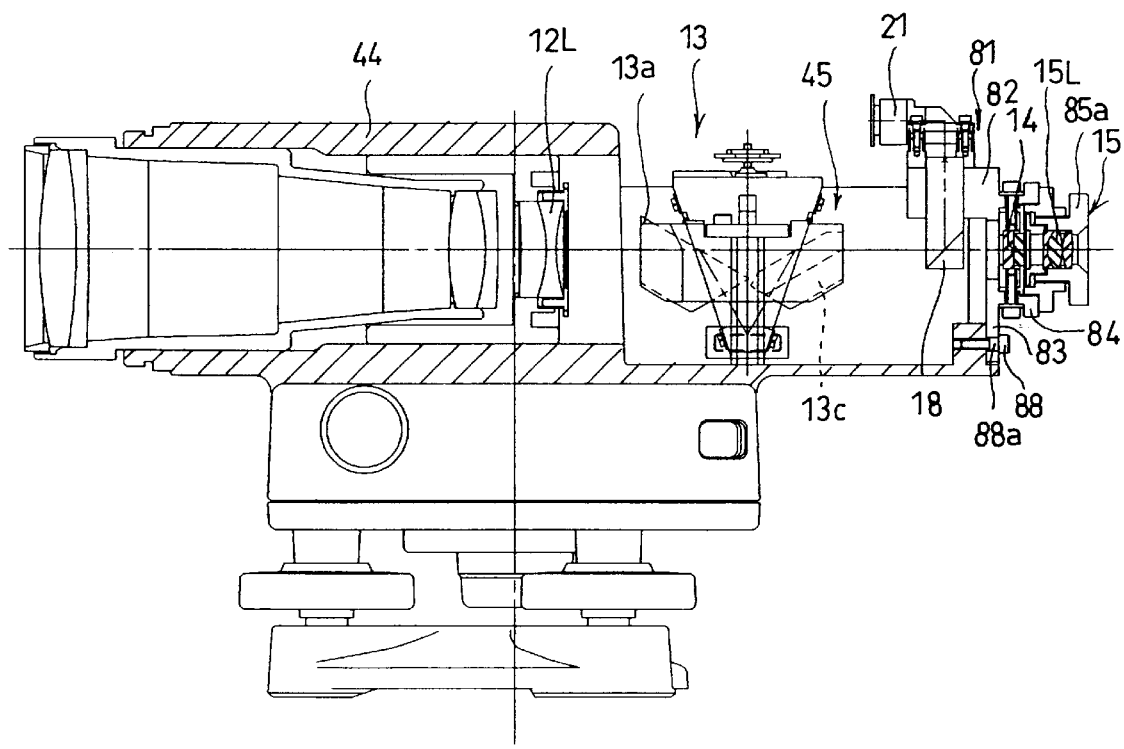
FIG. 9 is a longitudinal partial sectional view of an auto-level according to a third embodiment of the present invention.
Figure 12:
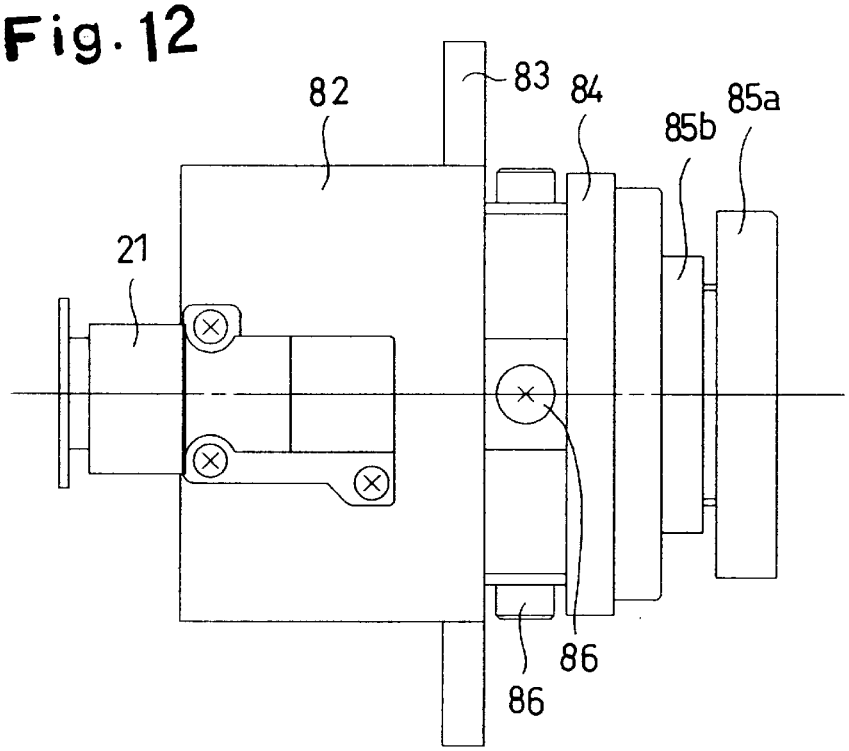
FIG. 12 is a plan view of the beam splitter, the AF sensor, the focusing plate and the eyepiece according to the third embodiment of the present invention.
Figure 11:
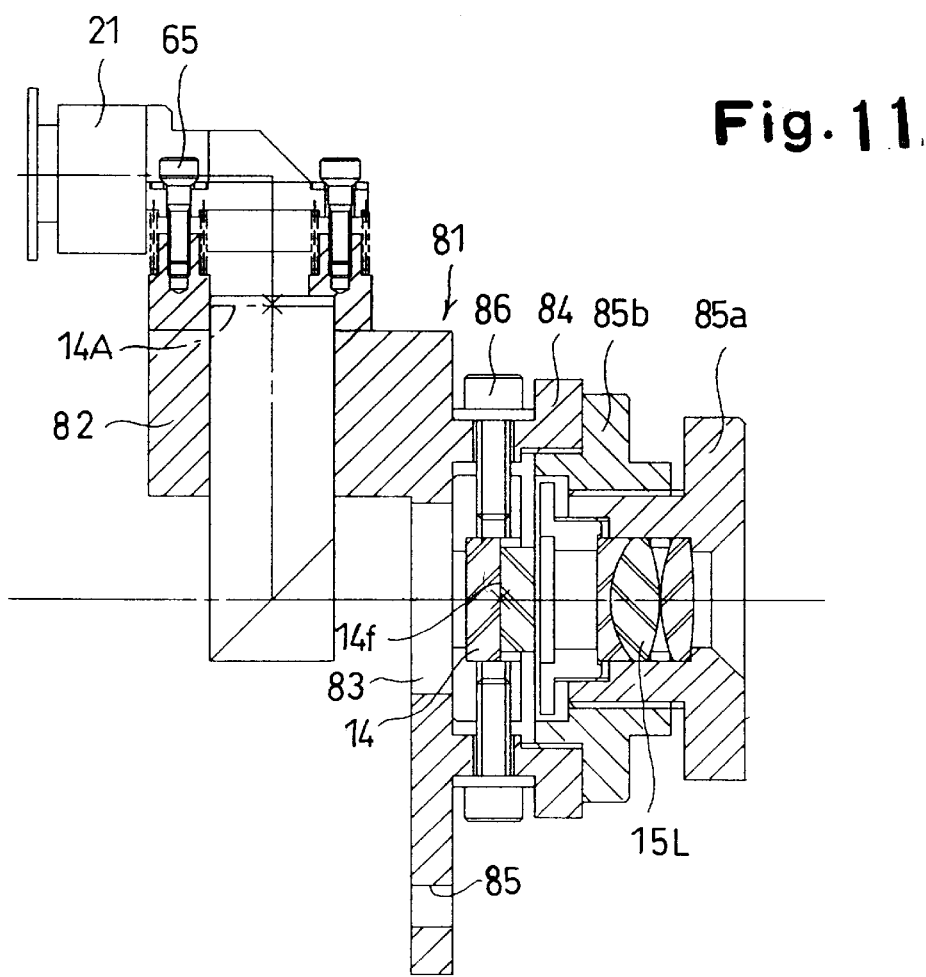
FIG. 11 is a longitudinal partial sectional view showing the main portion of a fixing structure in regard to a beam splitter, an AF sensor unit, a focusing plate and an eyepiece, according to the third embodiment of the present invention.
Figure 13:
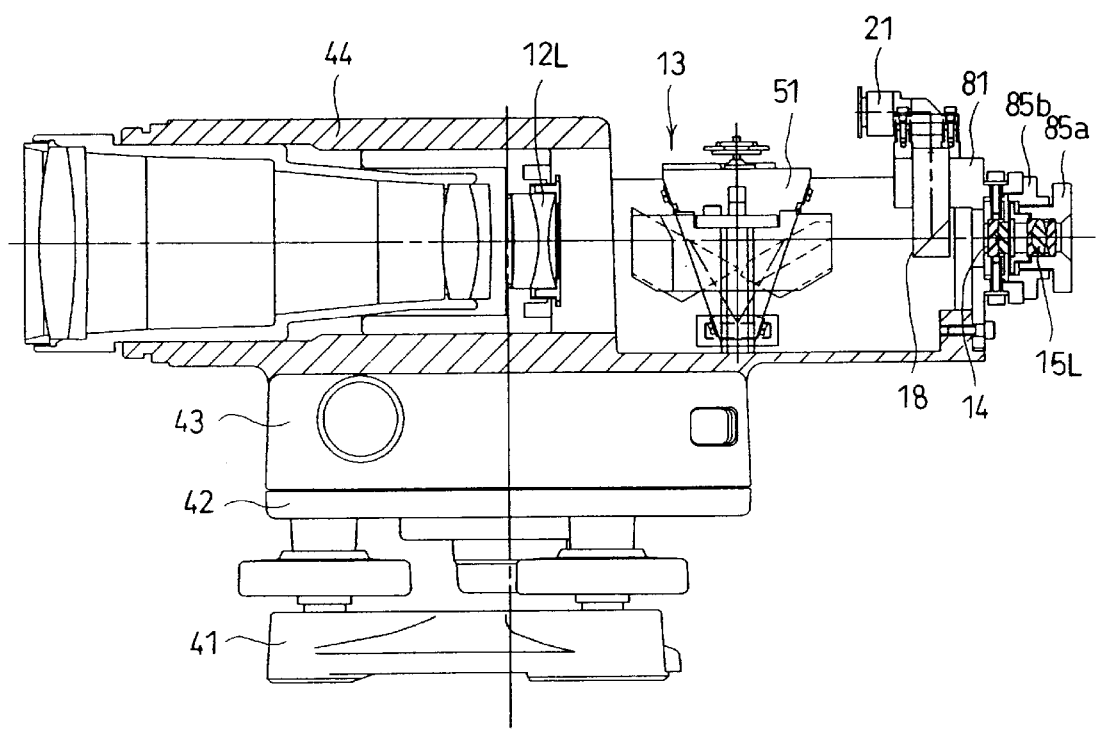
FIG. 13 is a longitudinal partial sectional view of an auto-level according to the third embodiment of the present invention.

FIGS. 7 and 8 illustrate a second embodiment of the present invention, in which if compared with the first embodiment, the sensor fixing frame 61 is fixed on the eyepiece fixing frame 71. In the second embodiment, the sensor fixing frame 611 is fixed on the eyepiece fixing frame 711 via screws, so that the beam splitter 18, the AF sensor unit 21, the focusing plate 14 and the eyepiece 15L are integrated as a unit which can be decoupled from and coupled to the lens barrel 44. In this embodiment, a connecting portion 64 is formed in the sensor fixing portion 611, and the connecting portion 64 has a fixing hole 64a. The eyepiece fixing frame 71 includes a shoulder portion 74 to which the connecting portion 64 is connected, and a screw hole 74a, the shank of which coincides with the shank of the fixing hole 64a. Consequently, the connecting portion 64 press-contacts the shoulder portion 74, and a fixing screw 79 is screwed into the screw hole 74a through the fixing hole 64a. Accordingly, the sensor fixing frame 61 is fixed on the eyepiece fixing frame 71 by screw. The integrated unit including the sensor fixing frame 61 and the eyepiece fixing frame 71 is decoupled from and coupled to the lens barrel 44 by the fixing screws 78, as illustrated in FIG. 6.

In the second embodiment, the shank of the fixing screw 79 and the inner peripheral wall of the screw hole 74a are formed so that positioning of the sensor fixing frame 611 and the eyepiece fixing frame 711 is determined by simply fixing the sensor fixing frame 611 on the eyepiece fixing frame 711 using a screw. As shown in FIG. 7, the positioning of the eyepiece fixing frame 711 in the lens barrel 44 in the optical axis direction is determined by contact of the fixing portion 72 with the supporting surface 47a. Further, the positioning of the eyepiece fixing frame 711 in the lens barrel 44 on the horizontal surface perpendicular to the optical axis is determined by contact of the shanks 78a of the fixing screws 78 with the inner peripheral wall of the positioning holes 73. Consequently, when the sensor fixing frame 611 is detached, the accurate positioning of the eyepiece fixing frame 711 in regard to the sensor fixing frame 611 is maintained. In this manner, the optically equivalent relationship between the focal plane 14f and the focus detecting focal plane 14A is maintained. With this arrangement, the adjustment of positioning between the beam splitter 18 and the AF sensor unit 21 is no longer required.

FIGS. 9 through 12 illustrate a third embodiment of the present invention, in which the beam splitter 18, the AF sensor unit 21, the focusing plate 14 and the eyepiece 15L are mounted to a common fixing frame 81 as an integrated unit. The common fixing frame 81 serves the same function as the fixing frames 611 and 711 discussed in the second embodiment, but in a combined structure. Although the fixing frames 611 and 711 in the second embodiment are connected by a screw, the common fixing frame 81 of the third embodiment is integrally formed. The beam splitter 18 is fixed on a horizontal portion 82 of the common fixing frame 81. The AF sensor unit 21 is adjustably screwed to the horizontal portion 82 using fixing screws 65.

The common fixing frame 81 further includes a vertical portion 83 perpendicular to the horizontal surface 82, and a cylindrically shaped eyepiece lens barrel 84 which supports the focusing plate 14 and the eyepiece 15L, each are integrally formed with the common fixing frame 81. Four supporting screws 86 are positioned in the radial direction towards the optical axis, and the focusing plate 14 is adjustably placed by the supporting screws 86 so that the surface of the focusing plate 14 is perpendicular to the optical axis. The eyepiece 15L is supported to move forward and backward along the optical axis via a diopter movement operation ring 85a and a diopter movement helicoid 85b.

The vertical portion 83 is shaped like a flange and engages with the support portion 47a of the lens barrel 44. A plurality of fixing holes 85, which additionally serve as positioning holes, are formed so that the pivot center of the fixing holes 85 corresponds to the pivot center of the screw holes 47b of the supporting surface 47a.

The vertical portion 83 of the common frame 81 engages (is in contact with) the support portion 47a. In this state, fixing screws 88 are screwed into the screw holes 47b through the fixing holes 85. The positioning of the common fixing frame 81 in the direction parallel to the optical axis is determined through contact of a position fixing portion 83 with the supporting surface 47a. Further, the positioning of the common fixing frame 81 in the direction perpendicular to the optical axis is determined through contact of shanks 88a of the fixing screws 88 with the inner peripheral wall of the positioning holes 85.

Consequently, according to the third embodiment of the present invention, since the beam splitter 18, the AF sensor unit 21, the focusing plate 14 and the eyepiece 15L are entirely fixed on the common fixing frame 81 as a unit, the decoupling from and coupling to the auto-level 10 can be carried out as a unit, offering easy maintenance. Additionally, since the beam splitter 18, the AF sensor unit 21, the focusing plate 14 and the eyepiece 15L are integrally fixed with each other, during coupling or decoupling of such a unit, the adjustment of positioning in regard to these components is no longer required. The positioning in regard to each optical component is determined by simply fixing the common fixing frame 81 on the lens barrel 44 using fixing screws 88, and hence, when being re-coupled, the adjustment of positioning of each optical component is no longer required.

Figure 16:
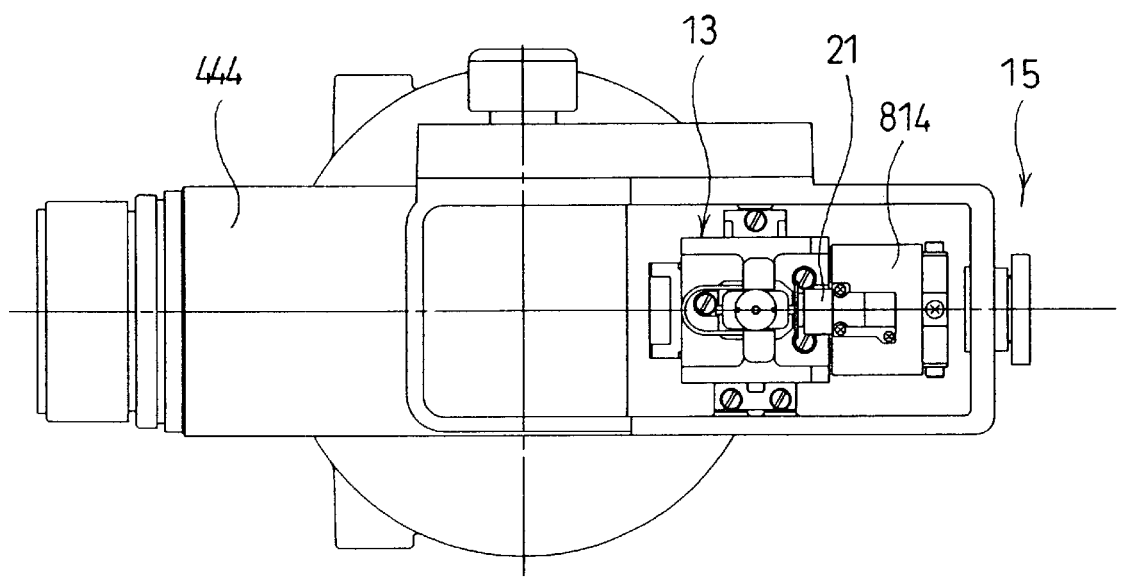
FIG. 16 is a plan view showing the structure of the main portion of an auto-level according to a fourth embodiment of the present invention.
Figure 17:
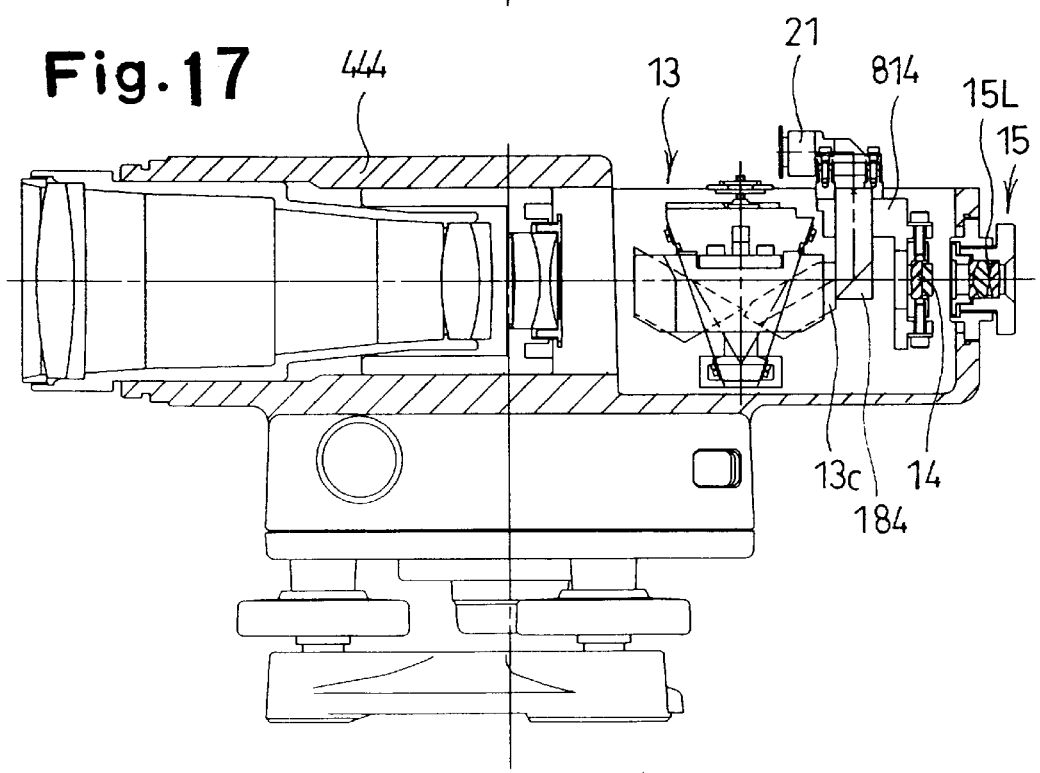
FIG. 17 is a longitudinal partial sectional view showing the structure of the main portion according to the fourth embodiment of the present invention.
Figure 18:
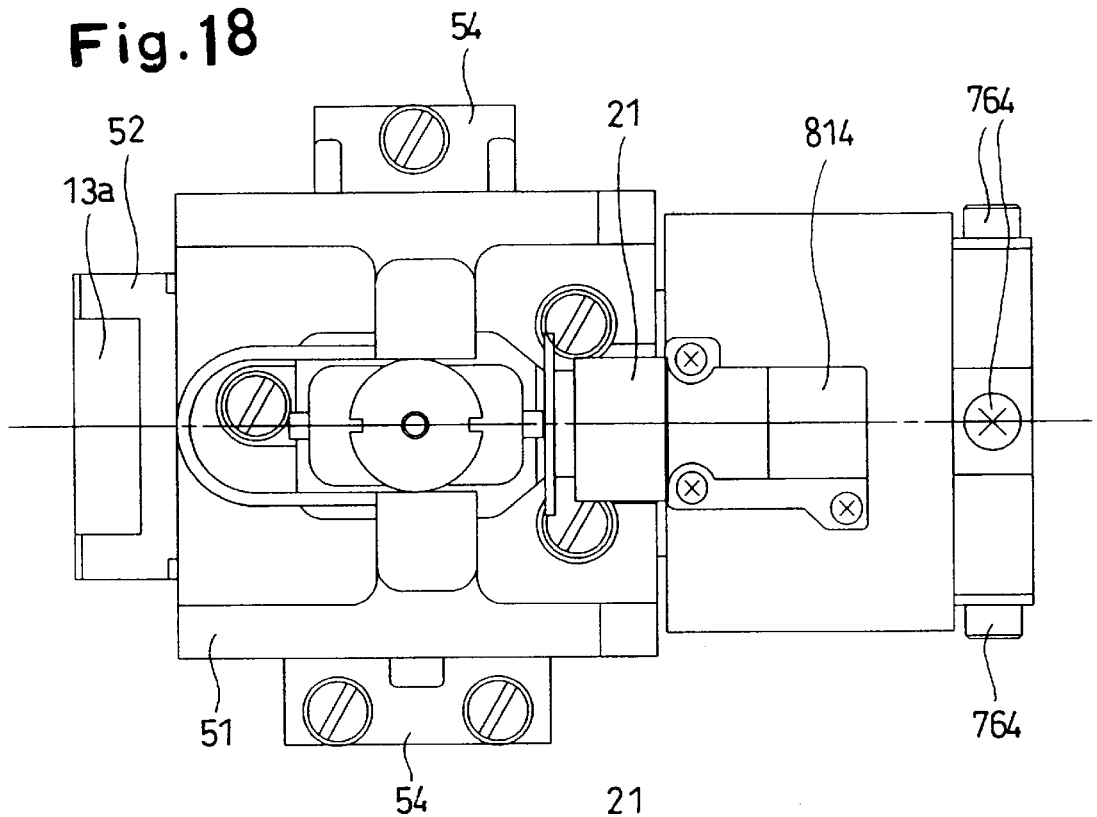
FIG. 18 is a plan view showing the structure of a beam splitter, an AF sensor unit and a focusing plate according to the fourth embodiment of the present invention.
Figure 19:
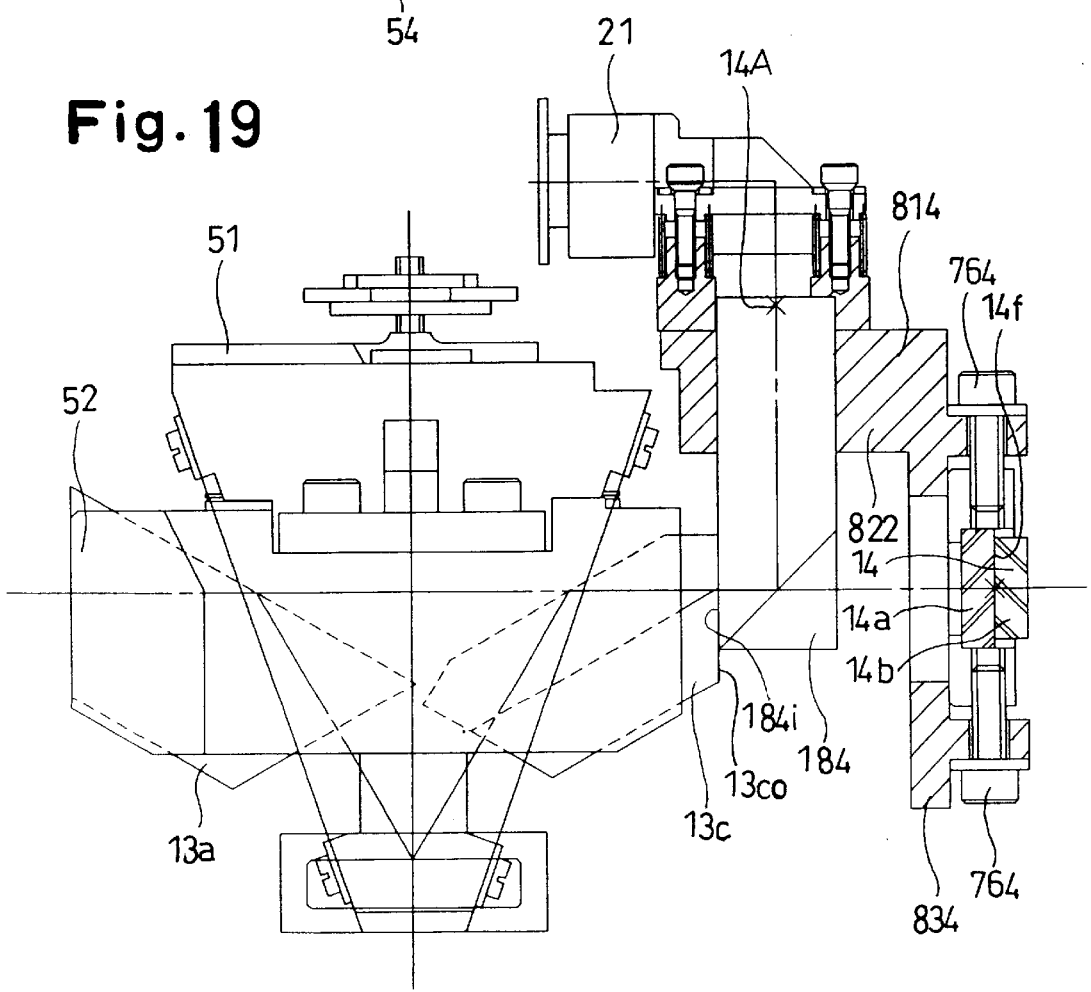
FIG. 19 is a longitudinal view showing the structure of the beam splitter, the AF sensor unit and a focusing plate according to the fourth embodiment of the present invention.
Figure 20:
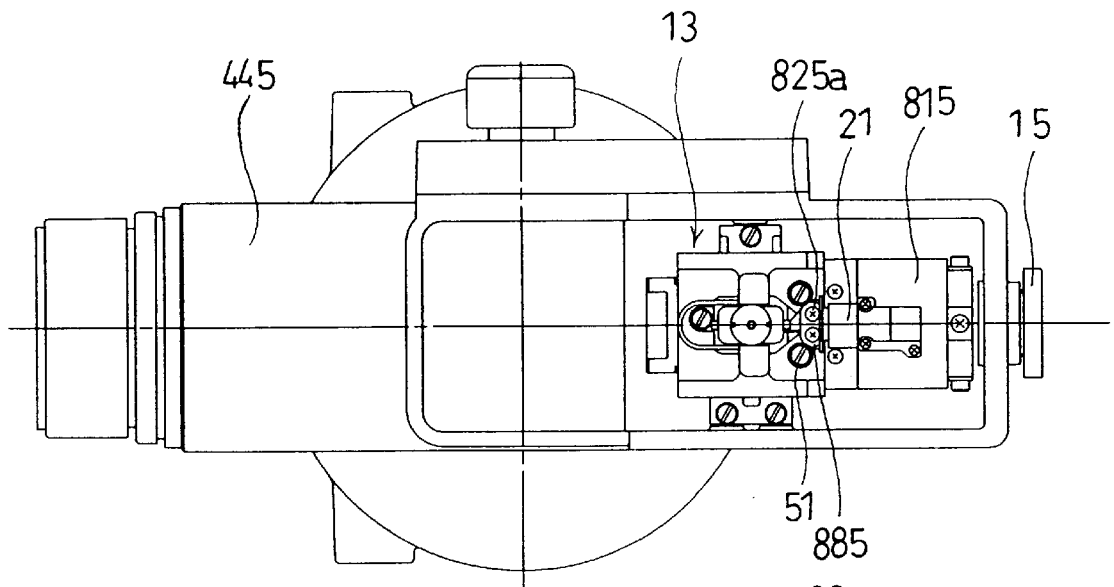
FIG. 20 is a plan view showing the structure of the main portion of an auto-level according to a fifth embodiment of the present invention.

FIGS. 16 through 18 illustrate a fourth embodiment of the present invention, in which the AF sensor unit 21, a beam splitter 184 and the focusing plate 14 are integrally formed with each other, and the integrated components are integrally fixed on the compensation prism 13a of the optical horizontal compensation system 13.

One of the most characteristic structures of the fourth embodiment is that a light incident surface 184i (upon which light is incident) of the beam splitter 184 is affixed to a light emitting surface 13co (from which light emits) of the second compensation prism 13c using an optical adhesive. In the fourth embodiment, the focusing plate 14 is supported by a common fixing frame 814 of the AF sensor unit 21 via position fixing screws 764. The focusing plate 14 includes the first focusing plate 14a and the second focusing plate 14b, the joint surface of which defines the focal plane 14f. An eyepiece 15 (the ocular optical system 15L) is mounted to the rear end (on the right of FIGS. 16 or 17) of a lens barrel 444.

As in the case of the first embodiment, the optical horizontal compensation system 13 is supported by the optical horizontal compensation system fixing frame 51. The optical horizontal compensation system 13 includes the positioning portion 54, so that the optical horizontal compensation system 13 is fixed on the lens barrel 444 by screws, so that the positioning of the optical horizontal compensation system 13 is determined by pressing on the end surface of the supporting portion of the lens barrel 444.

In the fourth embodiment of the present invention, the optical horizontal compensation system 13, the AF sensor unit 21 and the focusing plate 14 are integrally formed as a unit. Consequently, the positioning of these optical components mentioned above can be adjusted with respect to each other before the assembly is attached to the auto-level as a unit. When the optical horizontal compensation system 13, the AF sensor unit 21 and the focusing plate 14 are attached to the auto-level after completion of adjustment, the positioning of these optical components with each other has already been carried out. Consequently, the operator simply adjusts the overall positioning, which leads to easy adjustment operation during coupling. Additionally, during decoupling, the optical horizontal compensation system 13, the AF sensor unit 21 and the focusing plate 21 can be detached as a unit.

The AF sensor unit 21 is positioned at the overhead (overlapping) position of the optical horizontal compensation system 13. With such an overlapping structure of the AF sensor unit 21 in relation to the optical horizontal compensation system 13, the overall length of the auto-level can be shortened.

FIGS. 20 through 23 illustrate a fifth embodiment of the present invention, in which the AF sensor unit 21, a beam splitter 185, and the focusing plate 14 are integrally formed with each other, and the integrated components are integrally fixed on a supporting frame 525 of the optical horizontal compensation system 13.

Figure 21:
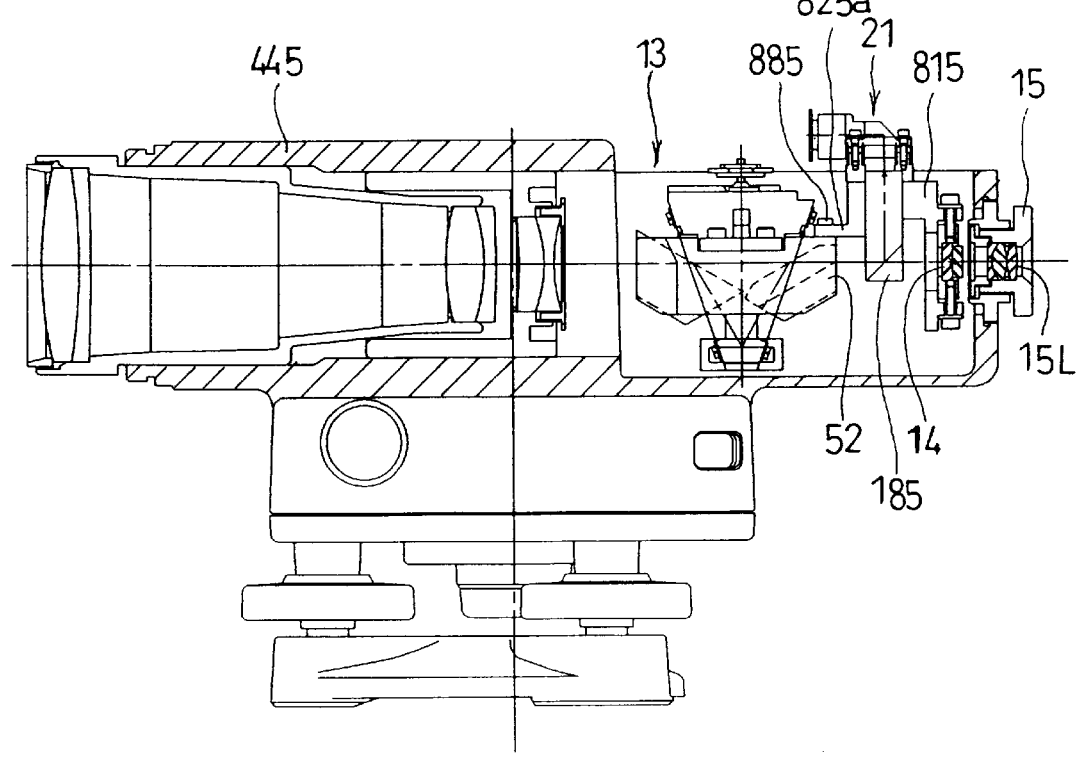
FIG. 21 is a longitudinal partial sectional view showing the structure of the main portion according to the fifth embodiment of the present invention.
Figure 22:
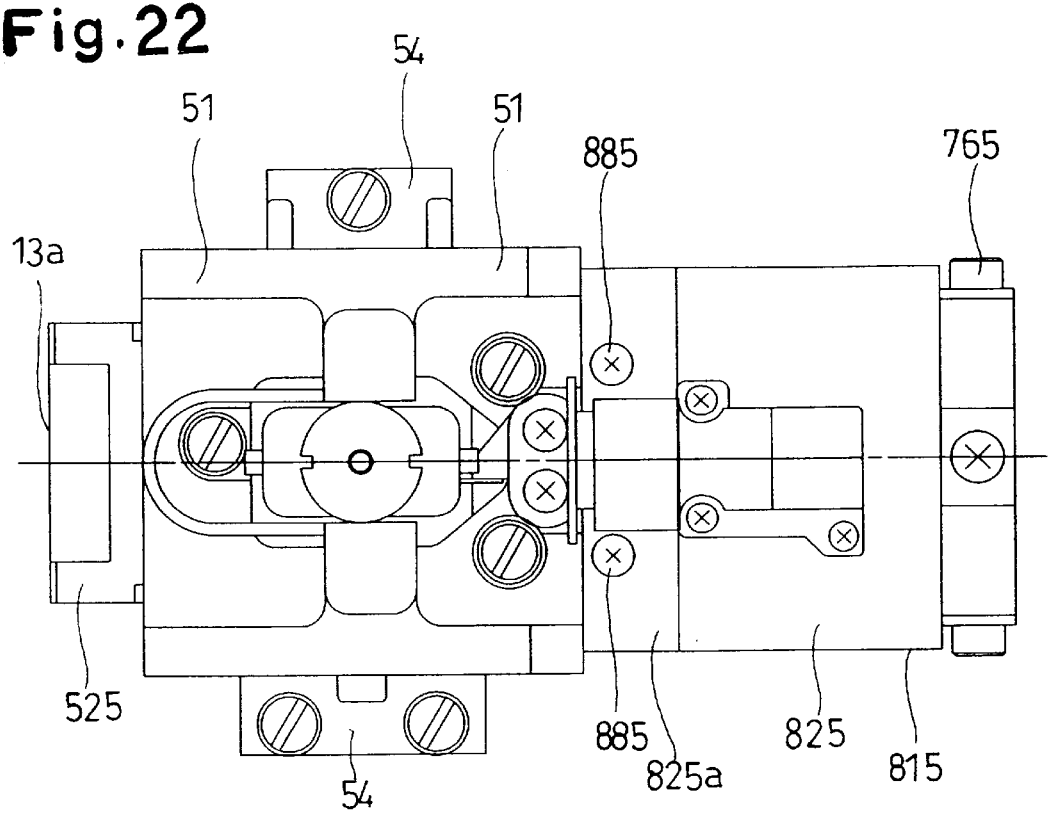
FIG. 22 is a plan view showing the structure of a beam splitter, an AF sensor unit and a focusing plate according to the fifth embodiment of the present invention.
Figure 23:
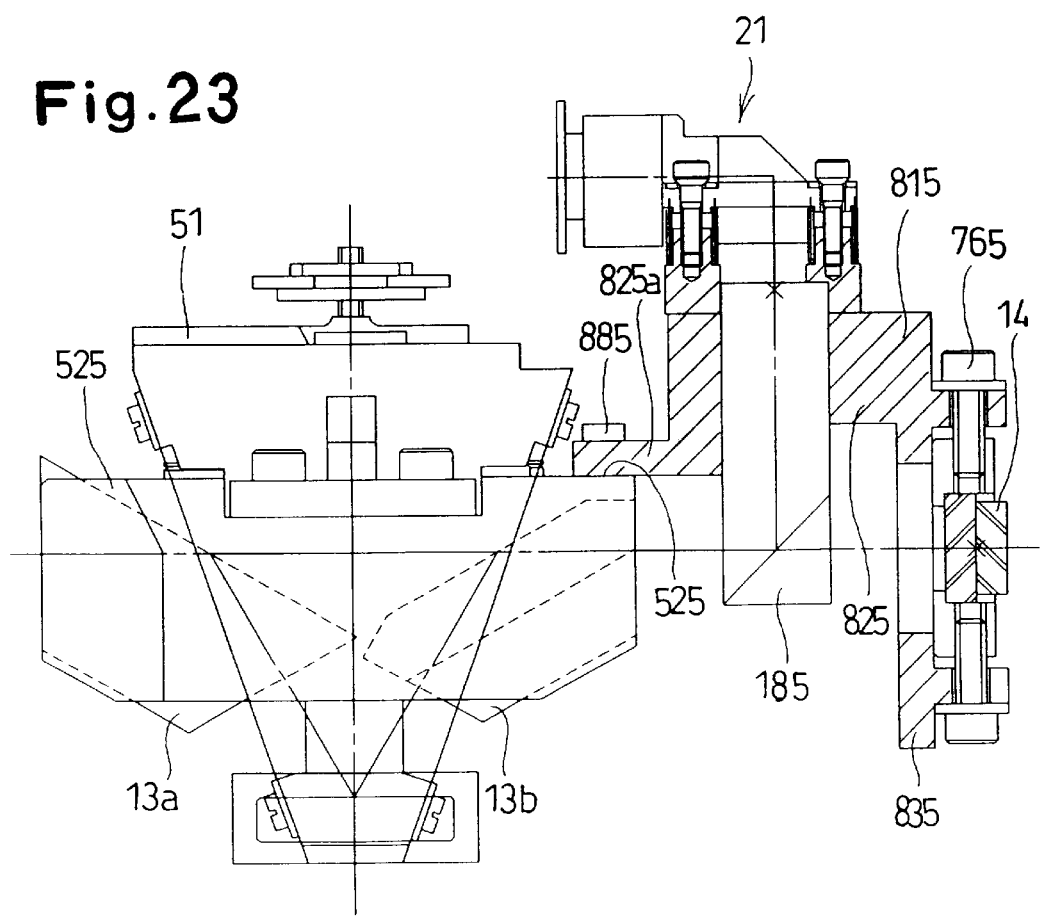
FIG. 23 is a longitudinal view showing the structure of the beam splitter, the AF sensor unit and a focusing plate according to the fifth embodiment of the present invention.
Figure 24:
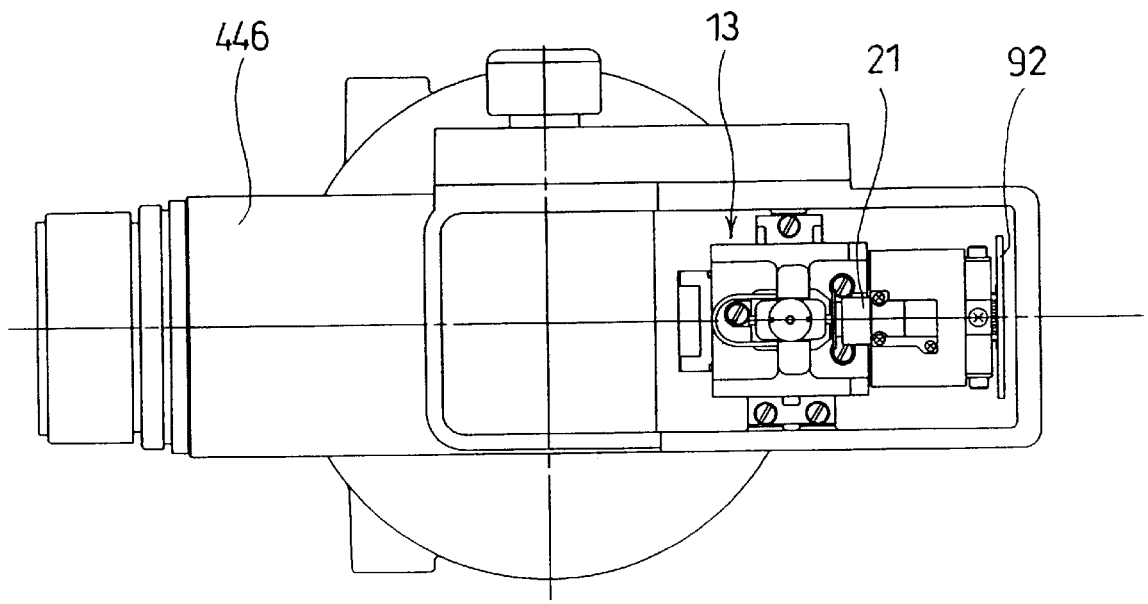
FIG. 24 is a plan view showing the structure of the main portion of an auto-level according to a sixth embodiment of the present invention.
Figure 25:
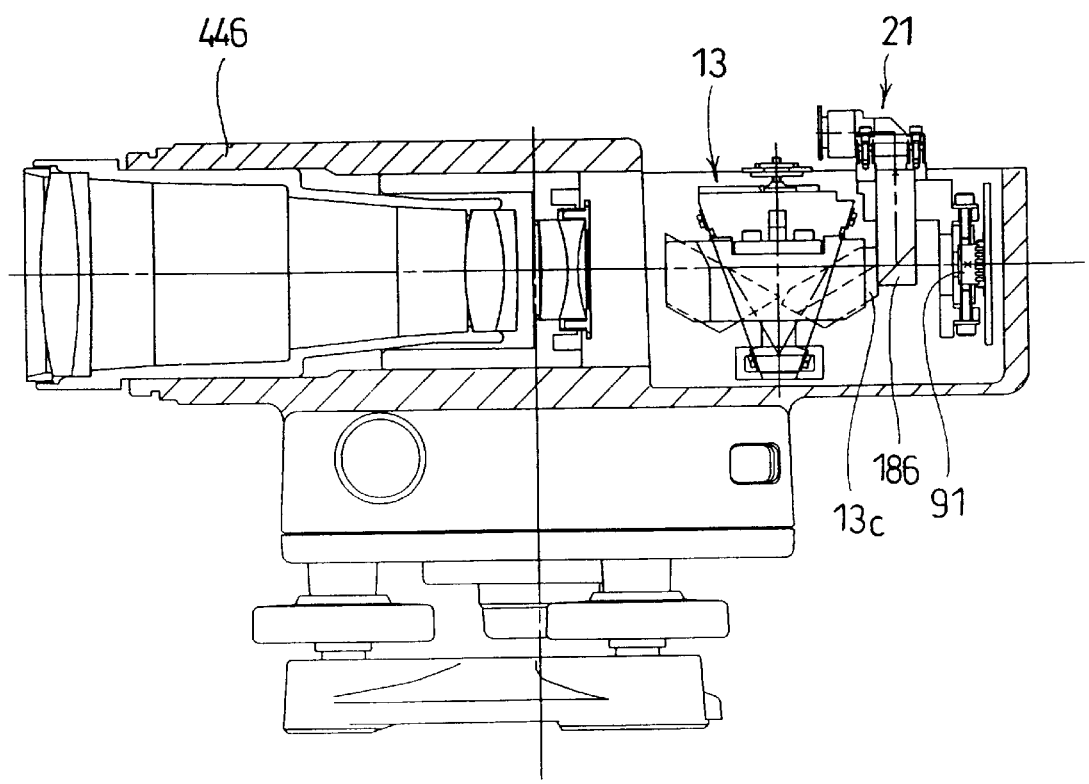
FIG. 25 is a longitudinal partial sectional view showing the structure of the main portion according to the sixth embodiment of the present invention.
Figure 26:
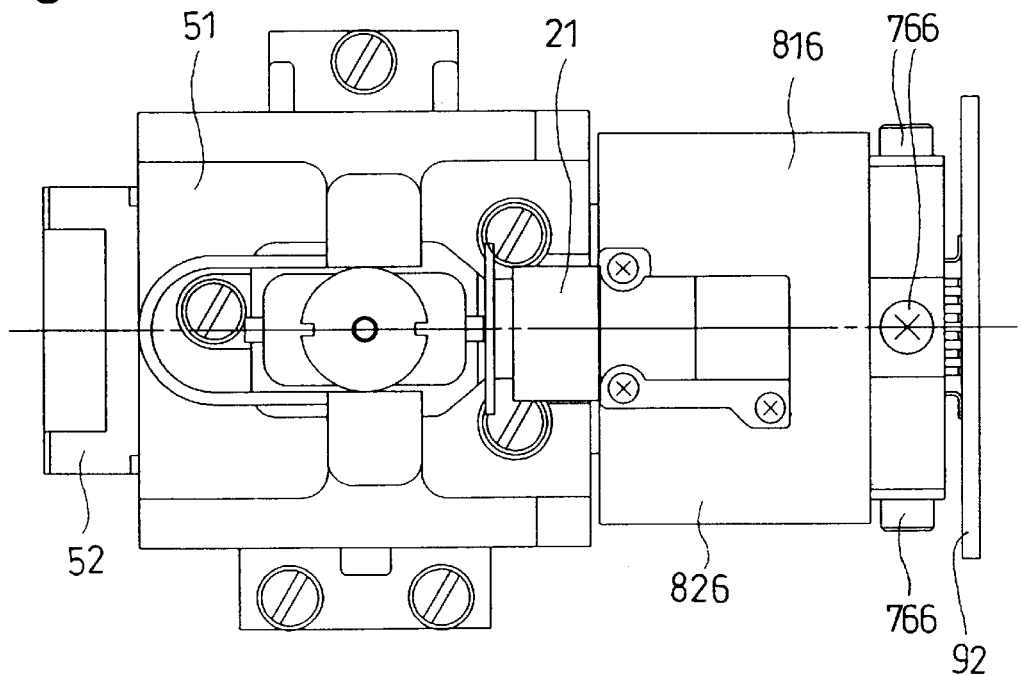
FIG. 26 is a plan view showing the structure of a beam splitter, an AF sensor unit and an imaging device according to the sixth embodiment of the present invention.
Figure 27:
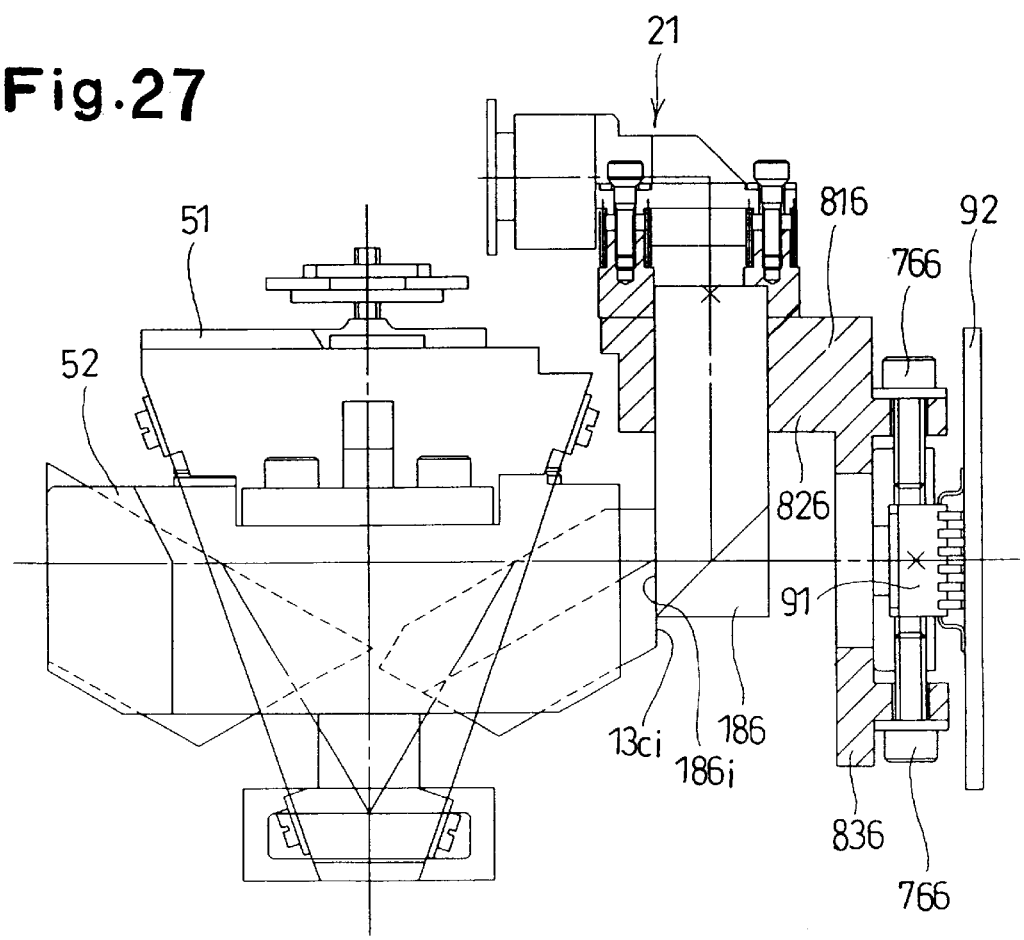
FIG. 27 is a longitudinal view showing the structure of the beam splitter, the AF sensor unit and an imaging device according to the sixth embodiment of the present invention.

In the fifth embodiment, a flange 825a is provided at the front side surface of a common fixing frame 815, which horizontally protrudes into the left side of FIG. 21. The flange 825a contacts the upper surface of the supporting frame 525, and is fixed by fixing screws 885. The eyepiece 15 (the ocular optical system 15L) is mounted toward the rear end (on the right of FIG. 20 or 21) of a lens barrel 445.

As in the case of the first embodiment, the optical horizontal compensation system 13 is supported by the optical horizontal compensation system fixing frame 51. The optical horizontal compensation system 13 includes the positioning portion 54, so that the optical horizontal compensation system 13 is fixed on the lens barrel 445 by screws, so that the positioning of the optical horizontal compensation system 13 is determined by pressing on the end surface of the supporting portion of the lens barrel 445.

In the fifth embodiment of the present invention, the AF sensor unit 21 and the optical horizontal compensation system 13 are respectively fixed by the fixing screws 885 so that each optical component can be detached from and attached to the lens barrel 445. Consequently, when both the AF sensor unit 21 and the optical horizontal compensation system 13 are attached (coupled) to the auto-level, it is possible to detach (decouple) only the AF sensor unit 21 and the focusing plate 14. Additionally, the adjustment of positioning of the optical horizontal compensation system 13 in relation to the AF sensor unit 21 and the focusing plate 14 can be carried out.

As in the fourth embodiment of the present invention, in the fifth embodiment, the optical horizontal compensation system 13, the AF sensor unit 21 and the focusing plate 14 are integrally formed as a unit. Consequently, the positioning of the optical components mentioned above can be adjusted with respect to each other, before the assembly is attached to the auto-level as a unit. When the optical horizontal compensation system 13, the AF sensor unit 21 and the focusing plate 14 are attached to the auto-level after completion of adjustment, the operator simply adjusts the positioning as a unit, which leads to easy coupling (attachment). Additionally, during adjustment, the optical horizontal compensation system 13, the AF sensor unit 21 and the focusing plate 14 can be detached (decoupled) as a unit, and the adjustment can therefore be carried out in a decoupled state of the optical components. The optical horizontal compensation system 13, the AF sensor unit 21 and the focusing plate 21, after completion of adjustment of positioning can be recoupled to the auto-level as a unit, which leads to easy adjustment of positioning after recoupling.

FIGS. 24 through 27 illustrate an auto-level including a CCD imaging element (CCD image sensor) 91 according to a sixth embodiment in the present invention. In contrast to the focusing plate 14 in the fourth embodiment, in the sixth embodiment, the CCD imaging element 91 is provided (instead of the focusing plate 14) in the position of the focusing plate 14.

A light incident surface 186i (upon which light is incident) of the beam splitter 186 is affixed to a light emitting surface 13co (from which light emits) of the second compensation prism 13c using an optical adhesive. The CCD imaging element 91 is supported by a common fixing frame 816 of the AF sensor unit 21 via four position fixing screws 766. The horizontal and vertical positions of the CCD imaging element 91 can be respectively adjusted using the position fixing screws 766.

The light receiving surface of the CCD imaging element 91 forms an image of an object, and the image is converted to an electrical image signal by the CCD imaging element 91. The object image is then generated again on an electronic viewfinder, i.e., a CRT display or a liquid crystal display (not shown) which is known per se.

As in the case of the first embodiment, the optical horizontal compensation system 13 is supported by the optical horizontal compensation system fixing frame 51. The optical horizontal compensation system 13 includes the positioning portion 54, so that the optical horizontal compensation system 13 is fixed on a lens barrel 446 by screws, so that the positioning of the optical horizontal compensation system 13 is determined by pressing on the end surface of the supporting portion of the lens barrel 446.

In the sixth embodiment of the present invention, the optical horizontal compensation system 13, the beam splitter 186, the AF sensor unit 21 and the CCD imaging element 91 are integrally formed as a unit. Consequently, when the optical horizontal compensation system 13, the beam splitter 18, the AF sensor unit 21 and the CCD imaging element 91 are entirely decoupled from the auto-level, the positioning of the optical horizontal compensation system 13, the beam splitter 18, the AF sensor unit 21 and the CCD imaging element 91 can be adjusted with respect to each other. The optical horizontal compensation system 13, the beam splitter 18, the AF sensor unit 21 and the CCD imaging element 91 can be decoupled from and coupled to the auto-level as a unit. Consequently, during coupling to the auto-level, the relative adjustment of positioning of respective optical components is no longer required, leading to easy re-attachment.

As in the sixth embodiment, the fifth embodiment of the present invention as discussed, the CCD imaging element 91 can be provided in place of the focusing plate 14. In this case, the eyepiece 15 is not required.

Although the above description relates to the auto-level to which the above embodiments in the present invention are applied, the following description relates to a total station to which seventh and eighth embodiments in the present invention are applied.

FIGS. 28–34 illustrate the total station according to embodiments of the present invention.

In the seventh and eighth embodiments shown in FIGS. 28 through 31, a beam splitting means and erecting optical system are formed as a unit.

Figure 28:
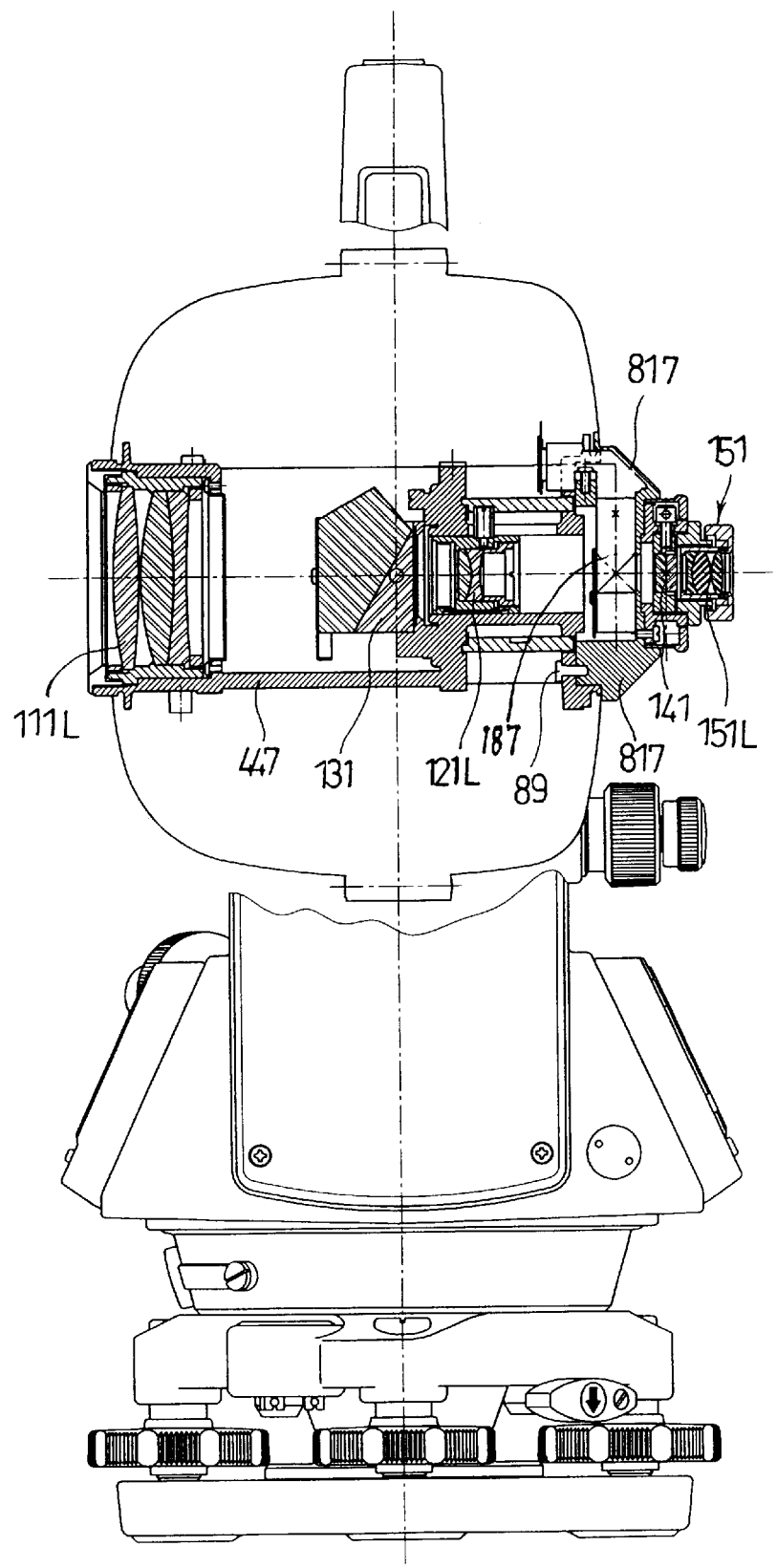
FIG. 28 is a longitudinal view showing the structure of the main portion according to a seventh embodiment of the present invention when applied to a total station.
Figure 29:
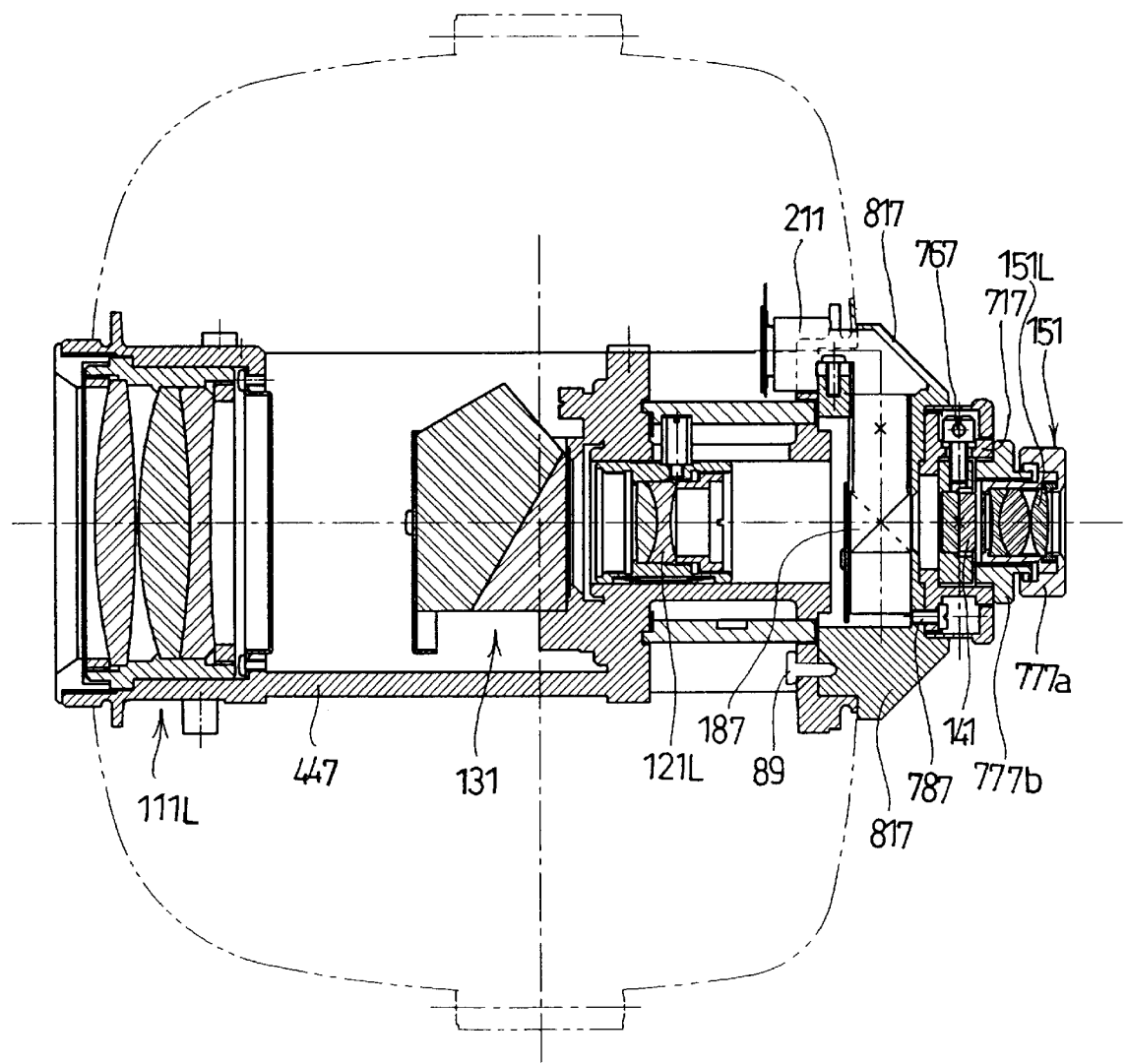
FIG. 29 is a longitudinal partial sectional view showing the structure of the main portion according to the seventh embodiment of the present invention.

In the seventh embodiment of the present invention, a collimating telescope includes a lens barrel 447, an objective lens group 111L, a prism 131, a focusing lens group 121L, a beam splitter 187, a focusing plate 141 and an eyepiece 151L, in the recited order from the object side (the left of FIG. 28). The focusing lens group 121L is moved forward and backward along the optical axis by a cam mechanism which is known per se, performing focusing.

The prism 131 is part of an electronic distance meter (not shown). That is, light radiating means and light receiving means are arranged above the prism 131. The light radiating means radiates a laser beam or e.g., infra red beam (IRED). The prism 131 has a dichroic surface. The ranging (distance-measuring) light emitted from the radiating means is reflected by the prism 131 to the focusing lens group 121L and transmitted to the objective lens group 111L. The ranging light transmitted to the objective lens group 111L is reflected by reflective means and reflected ranging light returns through the objective lens group 111L. The prism 131 reflects the ranging light received from the objective lens group 111L upward to the light receiving means.

Natural light (object light) passes through the objective lens group 111L and the prism 131. The object light mostly transmits through the erecting and beam splitting means 187 to the focusing plate 141, while part of the light is reflected at the beam splitter 187, and is directed to an AF sensor unit 211. The function of the AF sensor unit 211 is the same as that of the AF sensor unit 21 discussed above.

Figure 31:
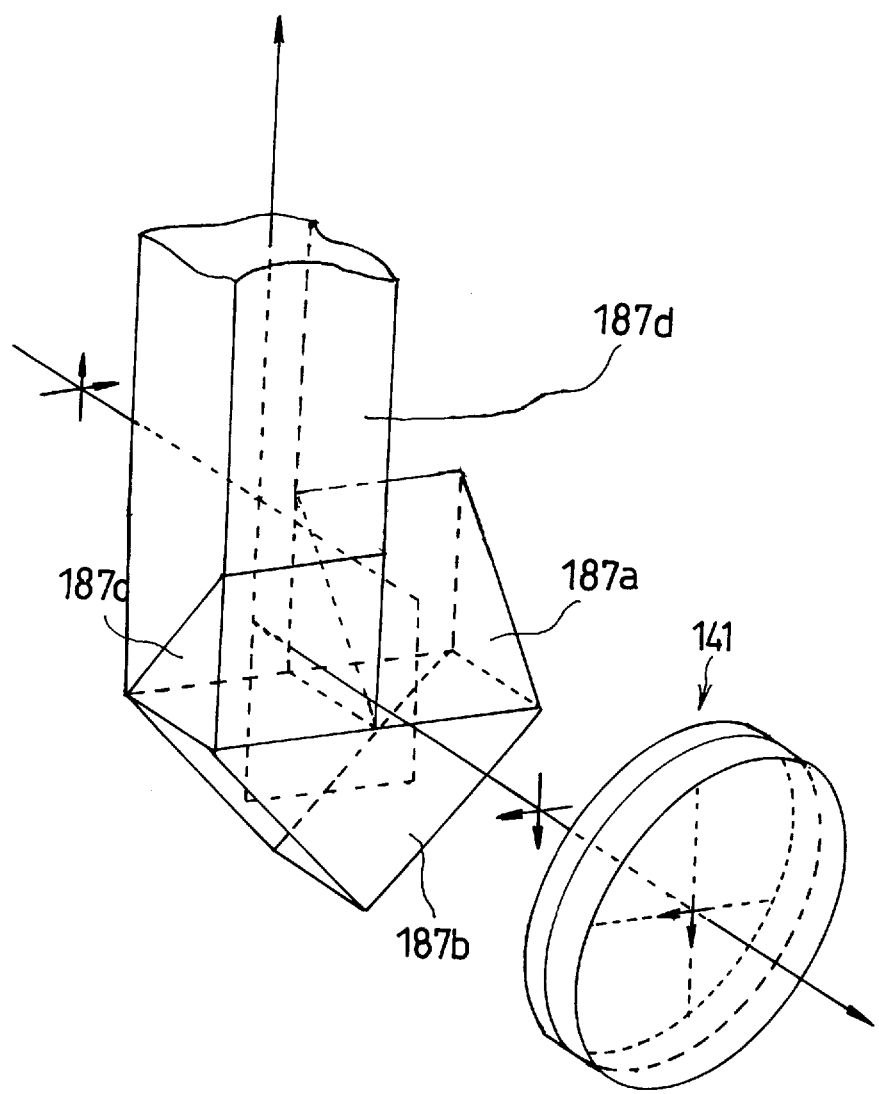
FIG. 31 is a perspective view showing the structure of the erecting and splitting optical system.

The erecting and beam splitting means 187 comprises 3 Porro prisms 187a, 187b, and 187c, as well as a square pillar 187d (see FIG. 31). The object light passed through the Porro prism 187c is guided with in the square pillar 187d to the AF sensor 211. The Porro prisms 187a and 187c are fixed to a rectangular prism 187b. The three Porro prisms 187a, 187b, and 187c and the square pillar 187d are fixed to each other and are supported by a common fixing frame 817. The common fixing frame 817 is fixed on the lens barrel 447 by a screw 89.

The focusing plate 141 and the eyepiece 151L are mounted to the common fixing frame 817. As is shown more specifically in FIG. 29, the focusing plate 141 and the eyepiece 151L are mounted to a cylindrically shaped eyepiece fixing frame 717, and the eyepiece fixing frame 717 is fixed on the common fixing frame 817 by a fixing screw 787. The focusing plate 141 is adjustably supported by a plurality of focusing plate supporting screws 767, so that the surface of the focusing plate 141 is perpendicular to the optical axis. The eyepiece 151L is supported to move forward and backward along the optical axis via a diopter movement operation ring 777a and a diopter movement helicoid 777b.

In the seventh embodiment, the erecting and beam splitting means 187, the AF sensor unit 211, the focusing plate 141 and the eyepiece 151L, which are positioned to the rear (on the right of FIG. 29) of the focusing lens group 121L, are integrally formed as a unit via the common fixing frame 817. Consequently, these optical components can be decoupled from and coupled to the lens barrel 447 as a unit via the common fixing frame 817.

The focusing plate 141 and the eyepiece 151L are fixed on the common fixing frame 817 by the fixing screw 787. Accordingly, the focusing plate 141 and the eyepiece 151L can also be decoupled from and coupled to the lens barrel 447 as a unit.

Figure 30:
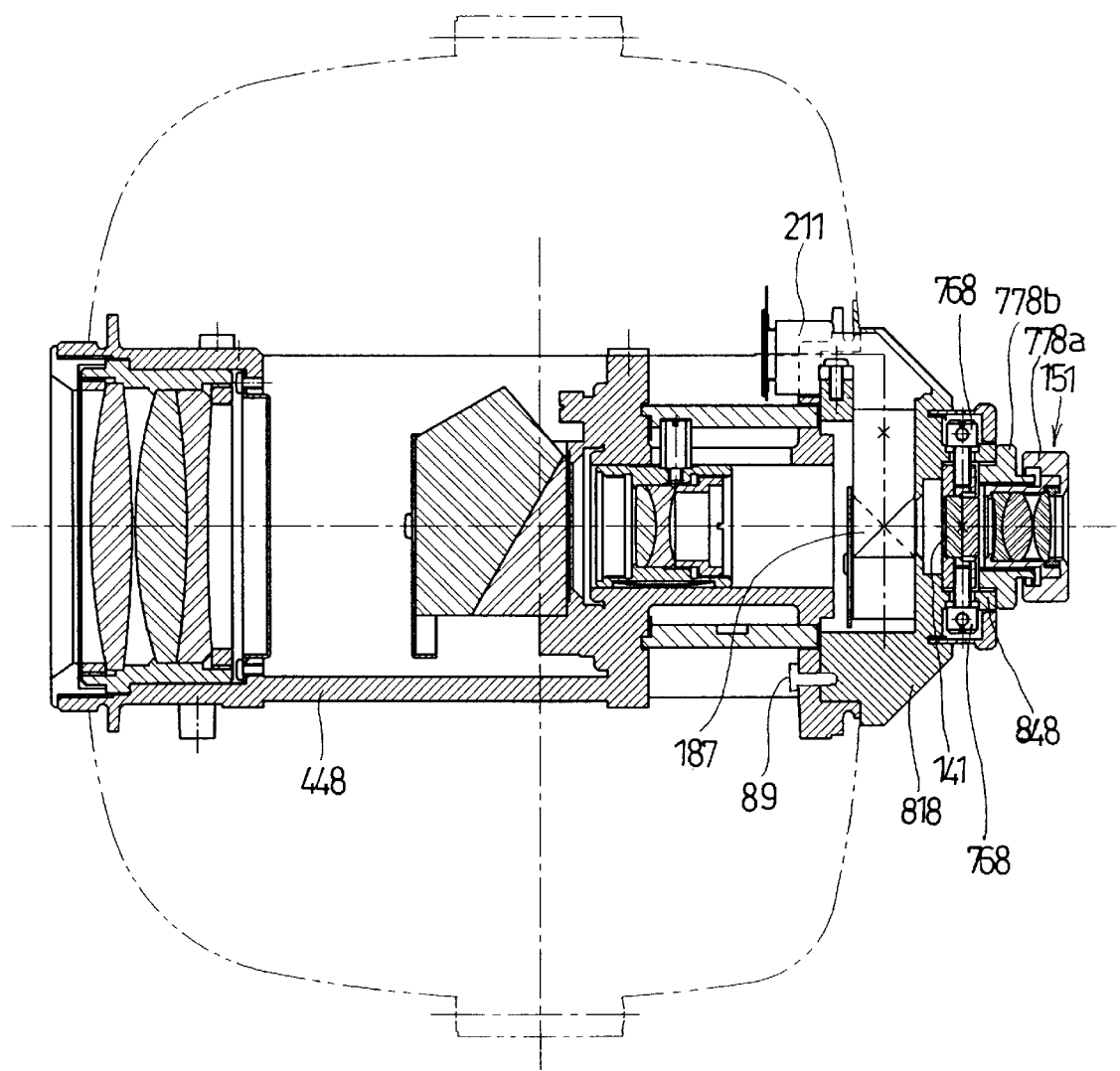
FIG. 30 is a longitudinal view showing the structure of the main portion according to an eighth embodiment of the present invention when applied to a total station.

FIG. 30 illustrates a total station to which an eighth embodiment of the present invention is applied. In the eighth embodiment, a focusing plate supporting barrel 848 is formed on a common frame 818, and inside the focusing plate supporting barrel 848, the focusing plate 141 is supported by focusing plate supporting screws 768. The eyepiece 151L is further supported by the focusing plate supporting barrel 848, so that the eyepiece 151L can be moved forward and backward along the optical axis via a diopter movement operation ring 778a and a diopter movement helicoid 778b. The common fixing frame 818 is fixed on a lens barrel 448 by the fixing screw 89.

In the eighth embodiment, the erecting and beam splitting means 187, the AF sensor unit 211, the focusing plate 141 and the eyepiece 151L, which are positioned toward the rear (on the right of FIG. 30) of the focusing lens group 121L, are integrally formed as a unit via the common fixing frame 818. Consequently, these optical components can be decoupled from and coupled to the lens barrel 447 as a unit via the common fixing frame 818.

Figure 32:
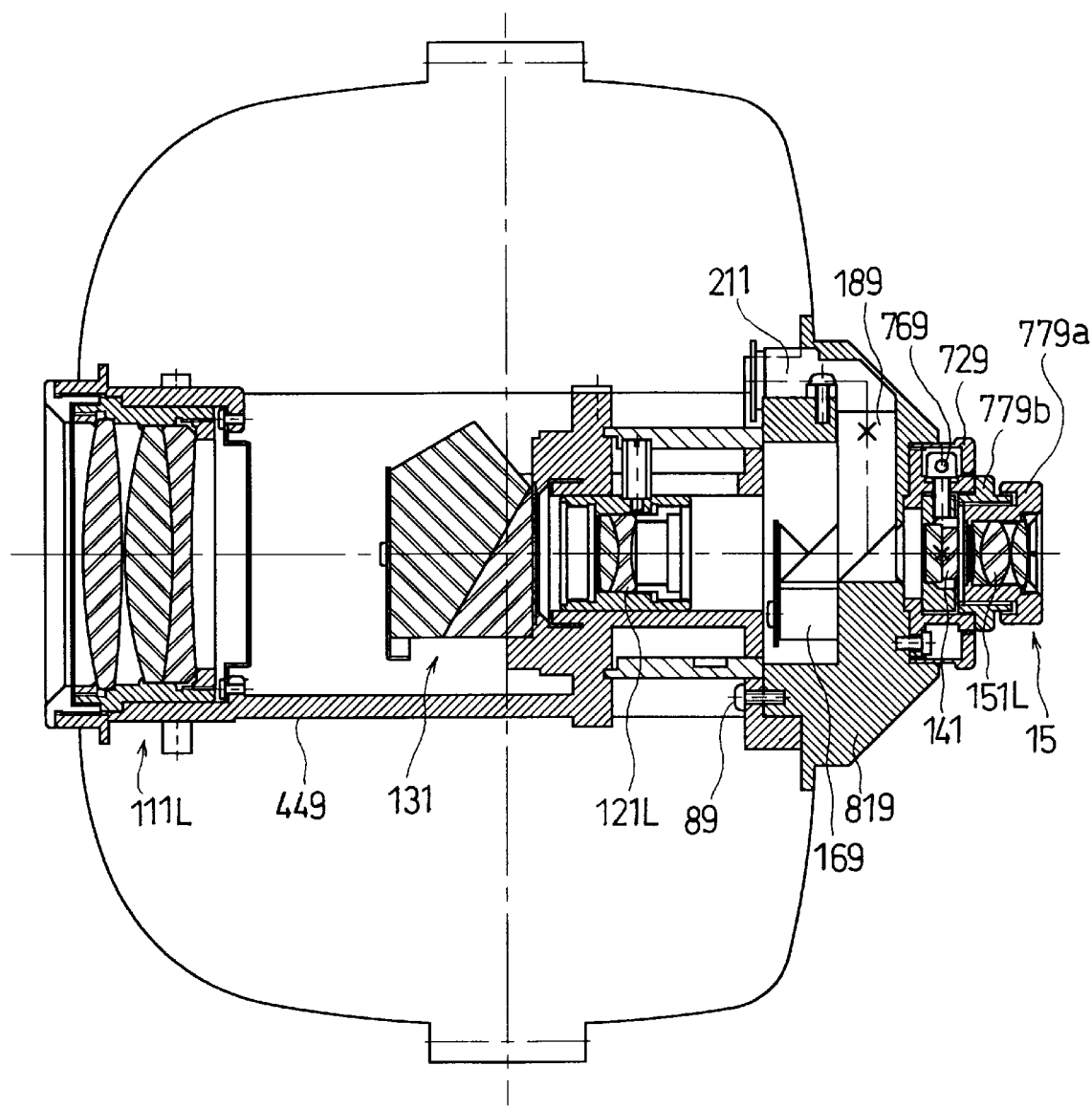
FIG. 32 is a longitudinal view showing the structure of the main portion according to a ninth embodiment of the present invention when applied to a total station.
Figure 33:
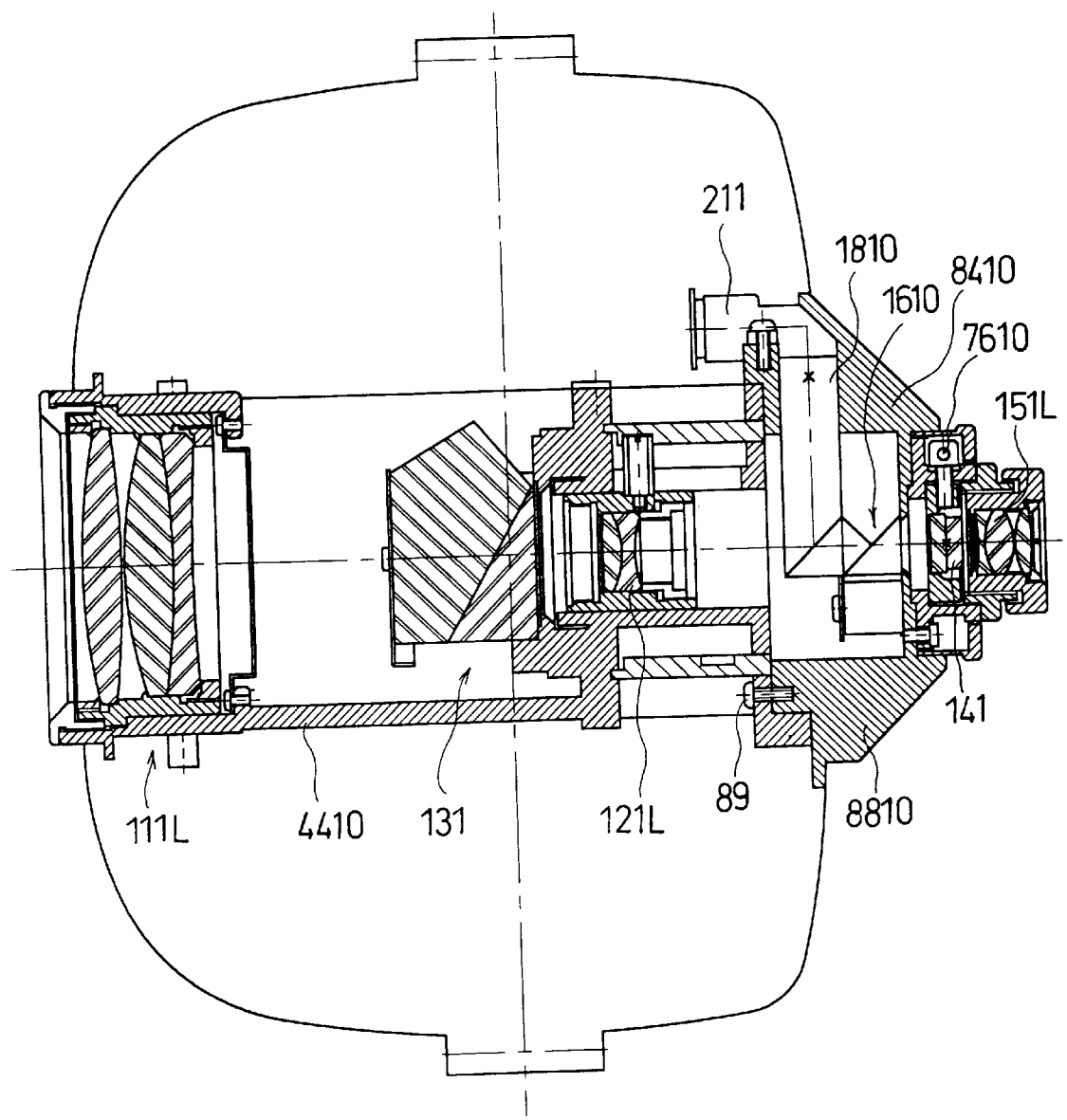
FIG. 33 is a longitudinal view showing the structure of the main portion according to a tenth embodiment of the present invention when applied to a total station.
Figure 34:
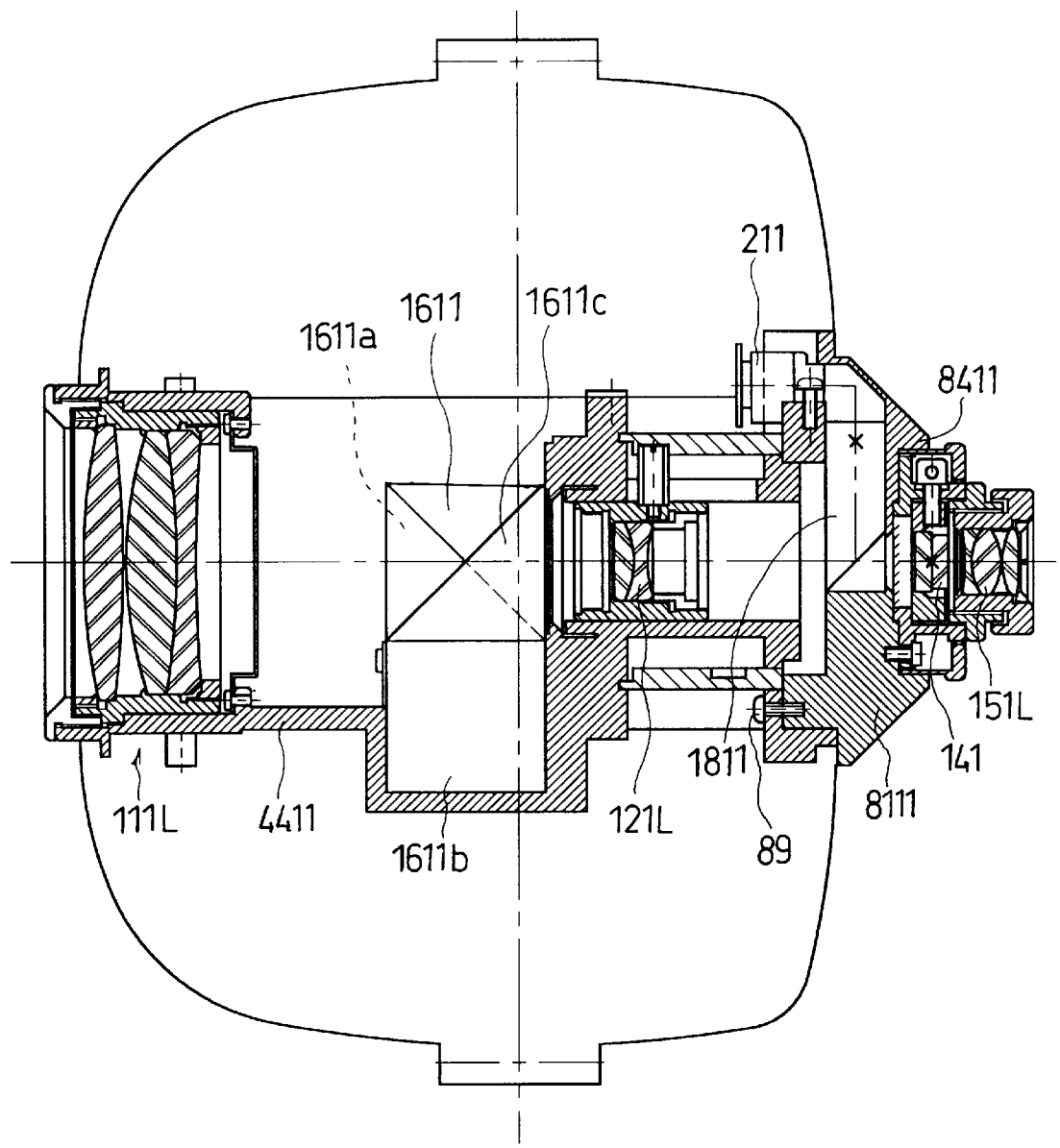
FIG. 34 is a longitudinal view showing the structure of the main portion according to an eleventh embodiment of the present invention when applied to a total station.

FIGS. 32 through 34 shows the ninth, tenth and eleventh embodiments, applying these other embodiments in a total station. In the ninth, tenth and eleventh embodiments, the beam splitting means and erecting optical system are independent, as in the first embodiment.

In the ninth embodiment shown in FIG. 32, an erecting optical system 169 is located on the object side of a beam splitter 189. The collimating telescope of the ninth embodiment includes (inside lens barrel 449), in order from the object side, the objective lens group 111L, the prism 131, the focusing lens group 121L, the erecting optical system 169, the beam splitter 189 and the focusing plate 141. The erecting optical system 169 includes Porro prisms structured as the Porro prisms 187a, 187b, and 187c shown in FIG. 31.

The erecting optical system 169, the beam splitter 189 and AF sensor 211 are supported by a common fixing frame 819. The common fixing frame 819 is fixed on the lens barrel 449 by a screw 89.

The focusing plate 141 and the eyepiece 151L are fixed on the common fixing frame 819 by the fixing screw. The eyepiece 151L is further supported by the focusing plate supporting barrel 849, so that the eyepiece 151L is moved forward and backward along the optical axis via a diopter movement operation ring 779a and a diopter movement helicoid 779b. Thus, the focusing plate 141 and the eyepiece 151L can also be detached from and attached to the lens barrel 449 as a unit.

In the tenth embodiment shown in FIG. 33, an erecting optical system 1610 is located on the focusing plate side of a beam splitter 1810. The collimating telescope of the ninth embodiment includes (inside lens barrel 4410), in order from the object side, the objective lens group 111L, the prism 131, the focusing lens group 121L, the beam splitter 1810, the erecting optical system 1610, and the focusing plate 141. The erecting optical system 1610 is formed of Porro prisms structured as the Porro prisms 187a, 187b, 187c shown in FIG. 31. The beam splitter 1810, the erecting optical system 1610 and the AF sensor 211 are supported by a common fixing frame 8110. The common fixing frame 8110 is fixed on the lens barrel 4410 by a screw 89.

The focusing plate 141 and the eyepiece 151L are fixed on the common fixing frame 8110 by the fixing screw. Thus, the focusing plate 141 and the eyepiece 151L can also be detached from and attached to the lens barrel 449 as a unit.

In the eleventh embodiment shown in FIG. 34, an erecting optical system 1611 is located between the objective lens group 111L and the focusing lens group 121L. The eleventh embodiment has no prism corresponding to the prism 131.

The collimating telescope of the eleventh embodiment includes (inside lens barrel 4411), in order from the object side, the objective lens group 111L, the erecting optical system 1611, the focusing lens group 121L, the beam splitter 1811, the focusing plate 141 and the eyepiece 151L. The erecting optical system 1611 includes Porro prisms structured as the Porro prisms 187a, 187b, 187c shown in FIG. 31. The prisms are mounted to the lens barrel 4411.

The beam splitter 1811 and the AF sensor 211 are supported by a common fixing frame 8111. The common fixing frame 8111 is fixed on the lens barrel 4411 by a screw 89.

The focusing plate 141 and the eyepiece 151L are fixed on the common fixing frame 8111 by the fixing screw. Thus, the focusing plate 141 and the eyepiece 151L can also be detached from and attached to the lens barrel 4410 as a unit.

In the above-mentioned embodiment, the image formed on the focal plane by the objective lens group is observed with the naked eye through the eyepiece. However, it is clear that an imaging element such as a CCD imaging element can be used instead of the focusing plate 14, so that the imaging element picks up the image formed by the objective lens group, and the image may be displayed on a TV monitor, etc.

As may be understood from the foregoing, according to the present invention, the beam splitting optical system and the focus detecting means can be decoupled from and coupled to the lens barrel as a unit, and an automatic focus detecting telescope is obtained in which easy maintenance is provided.

According to the present invention, when the optical horizontal compensation system is provided between the objective lens system and the beam splitting optical element, since the optical horizontal compensation system is formed to be detached (decoupled) from and attached (coupled) to the lens barrel, the optical horizontal compensation system can be separately detached (decoupled), facilitating repair or adjustment.

The optical horizontal compensation system, and the beam splitting optical system together with the focus detecting means, are formed as a unit which can be detached from and attached to the lens barrel, so that easy adjustment of positioning is possible in regard to the optical horizontal compensation system and the focus detecting means.

Since the focus detecting means is placed above the optical horizontal compensation system, the present invention can be applied for a short length type of telescope, or can be used to shorten the length of a telescope.

What is claimed is:

1. A focus detecting apparatus for a telescope system, comprising:
    a lens barrel;
    an attachment portion provided on said lens barrel;
    an objective lens system which includes an objective lens group and a focusing lens group, said objective lens system being supported by said lens barrel of said telescope;
    a beam splitting optical system including a beam splitting optical element that splits an optical path between said objective lens system and a focal plane;
    a focus detecting device that detects a focal state on a split focal plane in said beam splitting optical system that is optically equivalent to said focal plane;
    an optical horizontal compensation system located between said objective lens system and said beam splitting optical element, said optical horizontal compensation system being detachable from and attachable to said lens barrel; and
    an integral joining system for joining said beam splitting optical system and said focus detecting device, said beam splitting optical system and said focus detecting device being integrally joined via said integral joining system so that said beam splitting optical system and said focus detecting device are integrally detachable from and attachable to said attachment portion of said lens barrel of said telescope as a unit.

2. A focus detecting apparatus for a telescope system according to claim 1, further comprising a focusing device that moves said focusing lens group so that an object image formed by said objective lens system can be imaged on a predetermined focal plane.

3. A focus detecting apparatus for a telescope system according to claim 2, wherein said focus detecting device further comprising a detecting device which detects a focusing state based on a detecting signal of said focus detecting device.

4. A focus detecting apparatus for a telescope system according to claim 3, further comprising a driving device that moves said focusing lens group based on a detected focusing state to an object image formed by said objective lens system imaged on said predetermined focal plane.

5. A focus detecting apparatus for a telescope system according to claim 1, further comprising an imaging device which receives said object image, wherein a light receiving surface of said imaging device includes said focal plane.

6. A focus detecting apparatus for a telescope system according to claim 5, wherein said imaging device integrally includes said beam splitting optical system and said focus detecting device.

7. A focus detecting apparatus for a telescope system according to claim 1, further comprising an erecting optical system located between said objective lens system and said beam splitting optical system.

8. A focus detecting apparatus for a telescope system according to claim 7, wherein said beam splitting optical system and erecting optical system are integrally formed as a unit.

9. A focus detecting apparatus for a telescope system according to claim 1, wherein one of said beam splitting optical system and said lens barrel includes a positioning member that maintains an equivalent optical relation with respect to said focal plane and said split focal plane.

10. A focus detecting apparatus for a telescope system, comprising:
    a lens barrel;
    an attachment portion provided on said lens barrel;
    an objective lens system which includes an objective lens group and a focusing lens group;
    a focusing plate arranged at a predetermined position to form an object image via said objective lens system;
    an eyepiece lens group for observing an object image formed on said focusing plate;
    a beam splitting optical system including a beam splitting optical element that splits an optical path between said objective lens system and said focal plane;
    a focus detecting device that detects a focal state on a split focal plane in said beam splitting optical system that is optically equivalent to said focusing plate;
    a first integral joining system for joining said beam splitting optical system and said focus detecting device, said beam splitting optical system and said focus detecting device being integrally joined via said first integral joining system so that said beam splitting optical system and said focus detecting device are integrally detachable from and attachable to said attachment portion of said lens barrel of said telescope as a unit; and
    a second integral joining system for joining said focusing plate and said eyepiece lens group, said focusing plate and said eyepiece lens group being integrally joined via said second integral joining system so that said focusing plate and said eyepiece lens group are integrally detachable from and attachable to said attachment portion of said lens barrel of said telescope as a unit.

11. A focus detecting apparatus for a telescope system according to claim 10, wherein said focusing plate is integrally supported with said eyepiece lens group, and said focusing plate and said eyepiece lens group are integrally detachable from and attachable to said telescope as a unit.

12. A focus detecting apparatus for a telescope system according to claim 11, wherein said focusing plate and said eyepiece lens group are supported by a common fixing member, and said common fixing member is fixed by screws on a fixing member which supports said beam splitting optical system and said focus detecting device.

13. A focus detecting apparatus for a telescope system according to claim 10, wherein said focusing plate is integrally supported with said beam splitting optical system and said focus detecting device to be integrally detachable from and attachable to said telescope as a unit.

14. A focus detecting apparatus for a telescope system according to claim 13, wherein said beam splitting optical system, focus detecting device and said focusing plate are supported by a common fixing member, and said eyepiece lens group is supported by said common fixing member.

15. A focus detecting apparatus for a telescope system according to claim 10, wherein said focusing plate and said eyepiece lens group are integrally mounted to said beam splitting optical system and focus detecting device to be integrally detachable from and attachable to said telescope as a unit.

16. A focus detecting apparatus for a telescope system according to claim 15, wherein said imaging device, said beam splitting optical system and said focus detecting means are integrally formed, and said imaging device, said beam splitting optical system and said focus detecting means are integrally detachable from and attachable to said telescope as a unit.

17. A focus detecting apparatus for a telescope system according to claim 10, further comprising an optical horizontal compensation system located between said objective lens system and said beam splitting optical element, said optical horizontal compensation system being detachable from and attached to said telescope as a unit.

18. A focus detecting apparatus for a telescope system according to claim 17, said focus detecting device further comprising:
 a mirror that reflects light split by said beam splitting optical system toward an object side, and a sensor that receives said light reflected by said mirror, wherein said sensor overlaps said optical horizontal compensation system without interfering with said optical horizontal compensation system.

19. A focus detecting apparatus for a telescope system according to claim 10, further comprising an erecting optical system located between said objective lens system and said beam splitting optical system.

20. A focus detecting apparatus for a telescope system according to claim 19, wherein said beam splitting optical system and erecting optical system are integrally formed as a unit.

21. A focus detecting apparatus for a telescope system, comprising:
 an objective lens system that forms an object image on or near a predetermined focal plane;
 a beam splitting optical system including a beam splitting optical element that splits an optical path between said objective lens system and a focal plane;
 a focus detecting device that detects a focal state on a split focal plane in said beam splitting optical system that is optically equivalent to said focal plane; and
 an optical horizontal compensation system that is located between said objective lens system and said beam splitting optical system;
 wherein said optical horizontal compensation system is detachable from and attachable to said telescope, and said beam splitting optical system and said focus detecting device are integrally connected with said optical horizontal compensation system.

22. A focus detecting apparatus for a telescope system according to claim 21, said objective lens comprising at least an objective lens group and a focusing lens group.

23. A focus detecting apparatus for a telescope system according to claim 22, further comprising a focusing device that moves said focusing lens group so that an object image formed by said objective lens system can be imaged on a predetermined focal plane.

24. A focus detecting apparatus for a telescope system according to claim 21, wherein said beam splitting optical element is affixed to an optical element of said optical horizontal compensation system.

25. A focus detecting apparatus for a telescope system according to claim 24, wherein a fixing member that supports said beam splitting optical system and said focus detecting device, is supported by a supporting member of said optical horizontal compensation system using screws.

26. A focus detecting apparatus for a telescope system according to claim 21, further comprising a focusing plate including said focal plane.

27. A focus detecting apparatus for a telescope system according to claim 26, wherein said focus detecting plate is supported by a fixing member that supports said beam splitting optical system and said optical horizontal compensation system.

28. A focus detecting apparatus for a telescope system according to claim 21, said focus detecting device further comprising a mirror that reflects split light toward an object side and a sensor which receives said reflected by said mirror.

29. A focus detecting apparatus for a telescope system according to claim 21, said focus detecting device further comprising a mirror that reflects split light toward an object side, and a sensor which receives said light reflected by said mirror, wherein said sensor overlaps said optical horizontal compensation system without interfering with said optical horizontal compensation system.

30. A focus detecting apparatus for a telescope system according to claim 21, wherein one of said beam splitting optical system and said focus detecting device and said lens barrel includes a positioning member that maintains an equivalent optical relation with respect to said focal plane and a split focal plane.

* * * * *